Jan. 10, 1939.  R. F. DIRKES ET AL  2,143,828

TELEGRAPH PRINTER-REPERFORATOR

Filed April 6, 1937  7 Sheets-Sheet 1

INVENTORS
R. F. DIRKES
R. WENTWORTH
BY
Eugene C. Brown
ATTORNEY

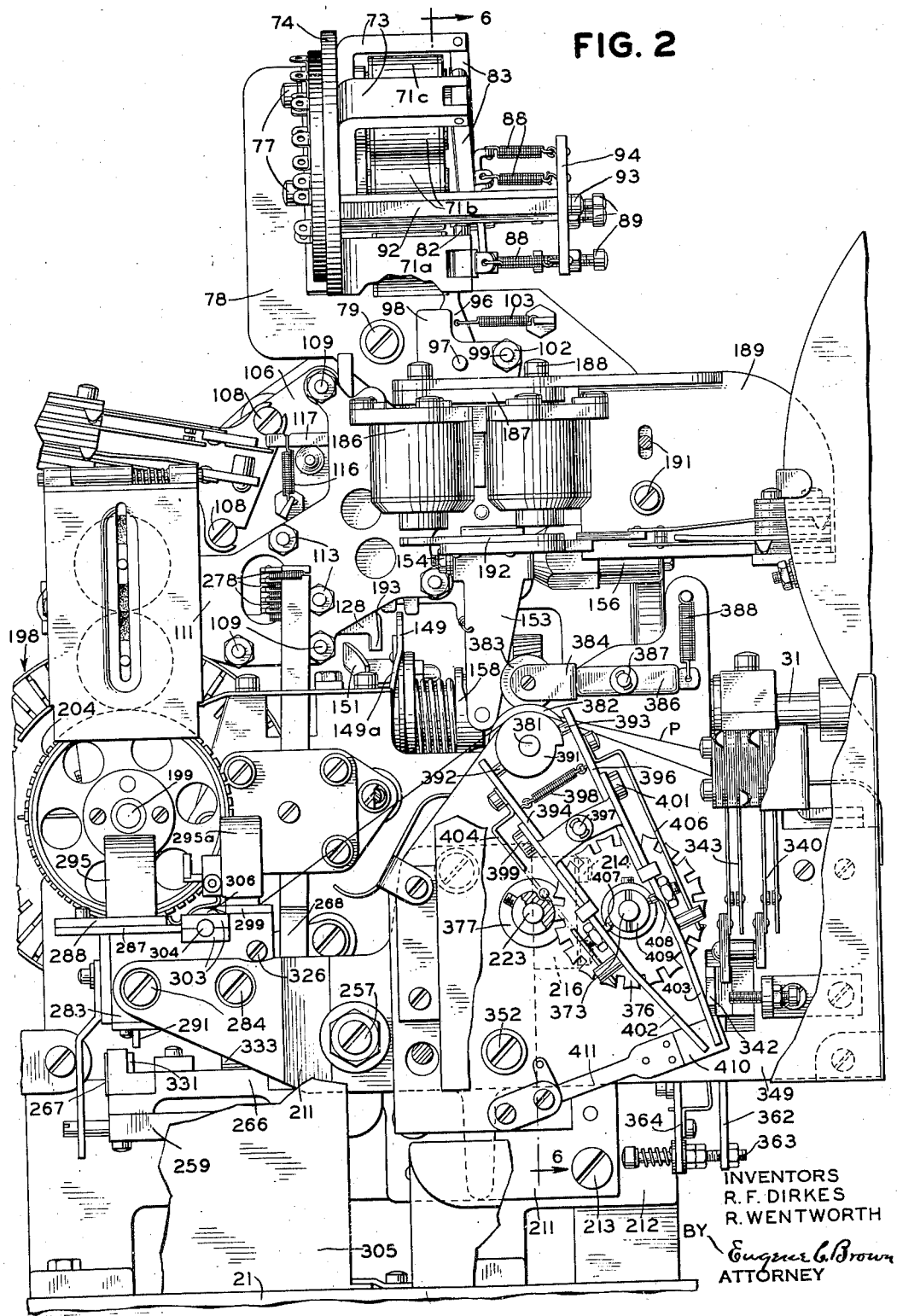

Jan. 10, 1939.   R. F. DIRKES ET AL   2,143,828
TELEGRAPH PRINTER-REPERFORATOR
Filed April 6, 1937   7 Sheets-Sheet 3
FIG. 4
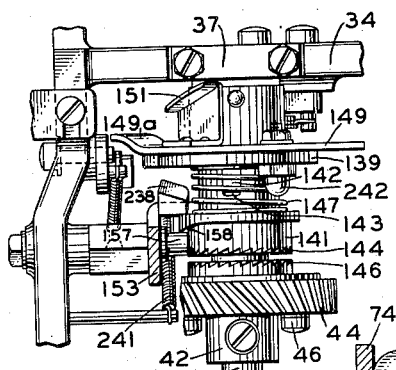
FIG. 5
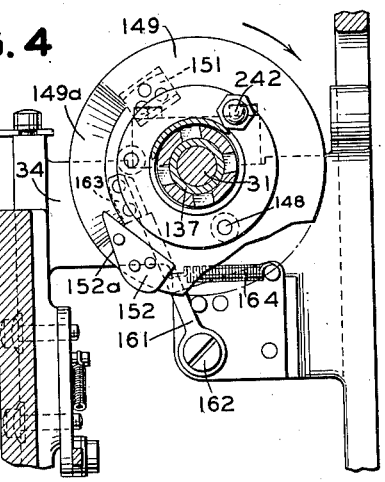
FIG. 3
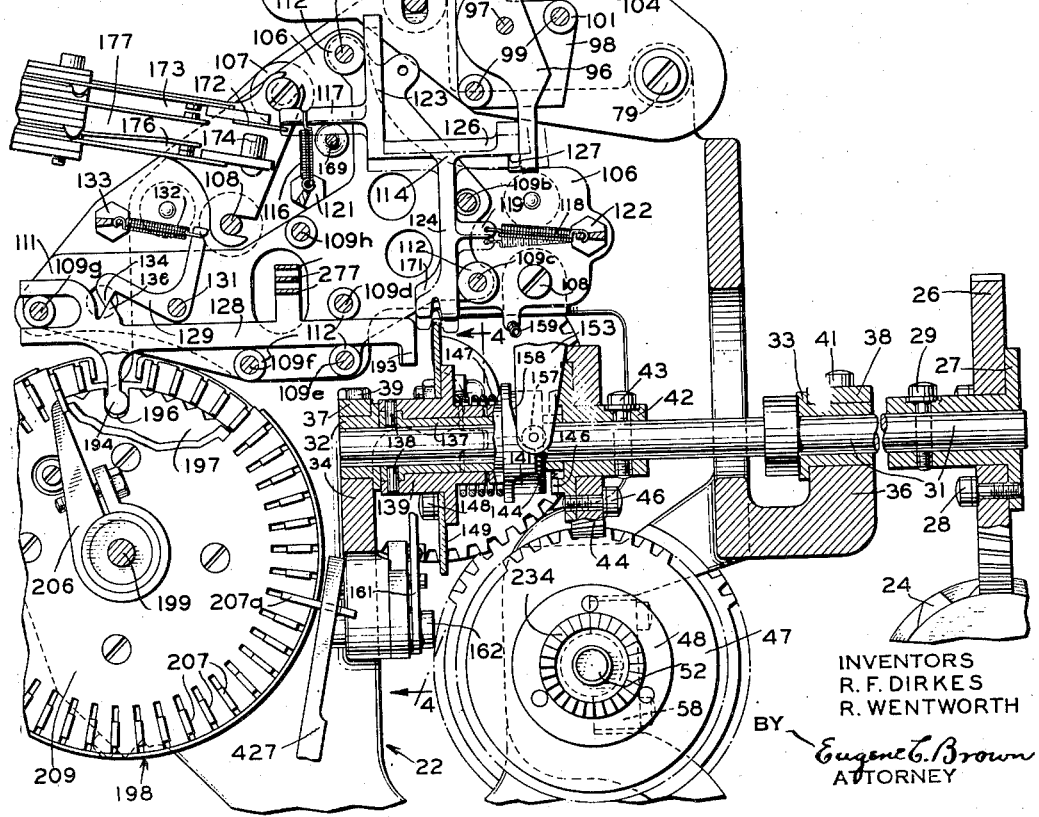
INVENTORS
R. F. DIRKES
R. WENTWORTH
BY
Eugene C. Brown
ATTORNEY

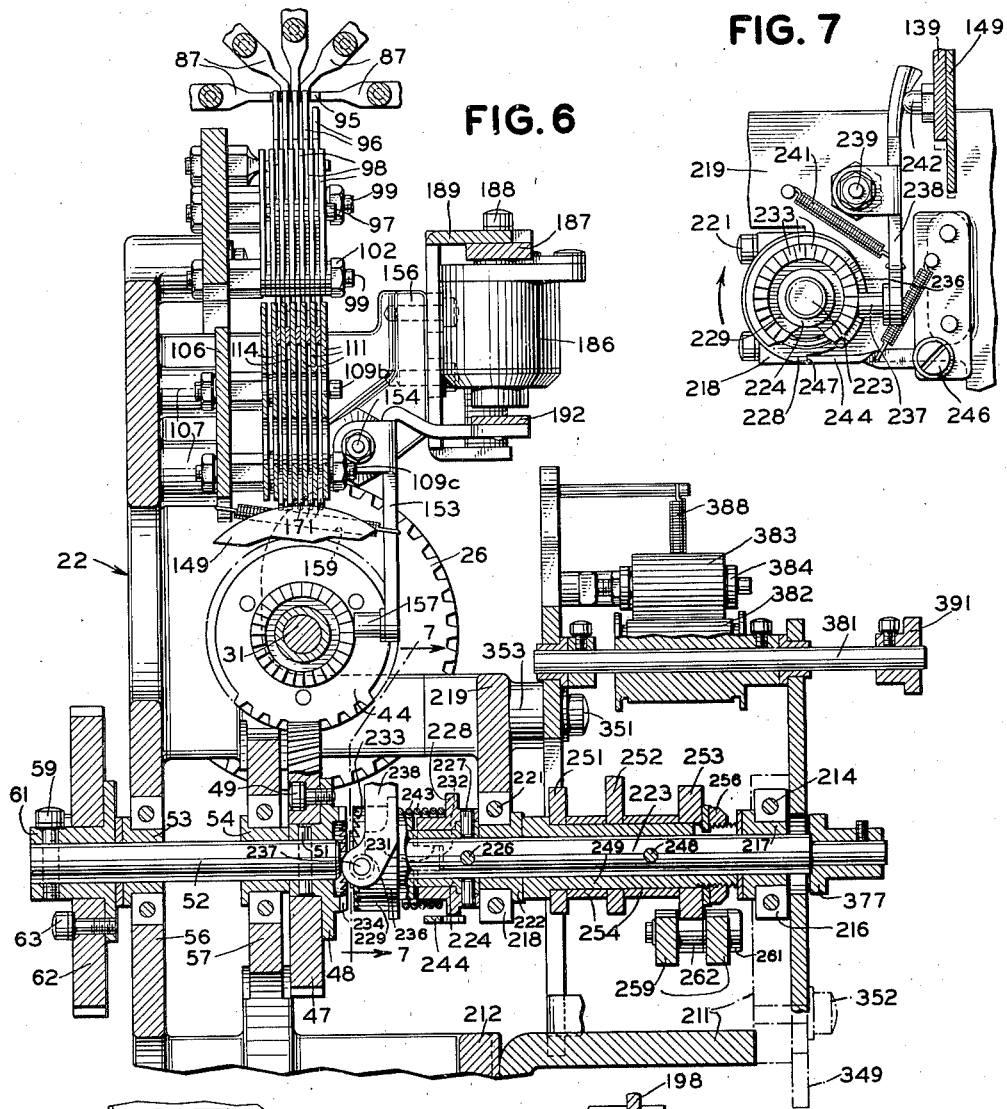
FIG. 6
FIG. 7
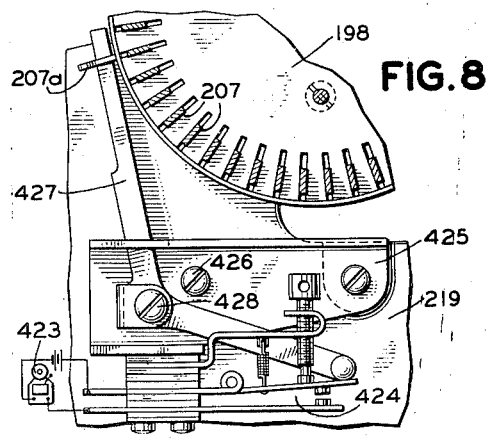
FIG. 8
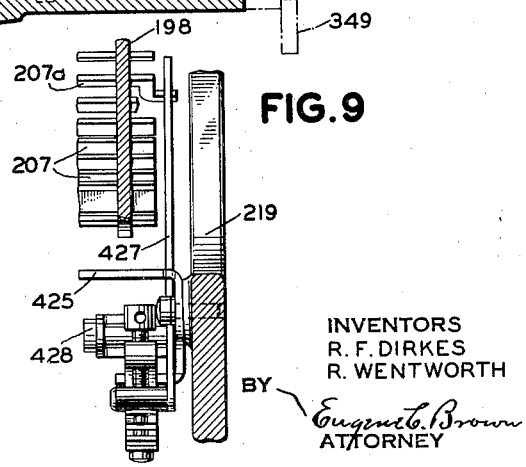
FIG. 9
INVENTORS
R. F. DIRKES
R. WENTWORTH
BY Eugene C. Brown
ATTORNEY Jan. 10, 1939.  R. F. DIRKES ET AL  2,143,828
TELEGRAPH PRINTER-REPERFORATOR
Filed April 6, 1937  7 Sheets-Sheet 5

INVENTORS
R. F. DIRKES
R. WENTWORTH
BY Eugene C. Brown
ATTORNEY

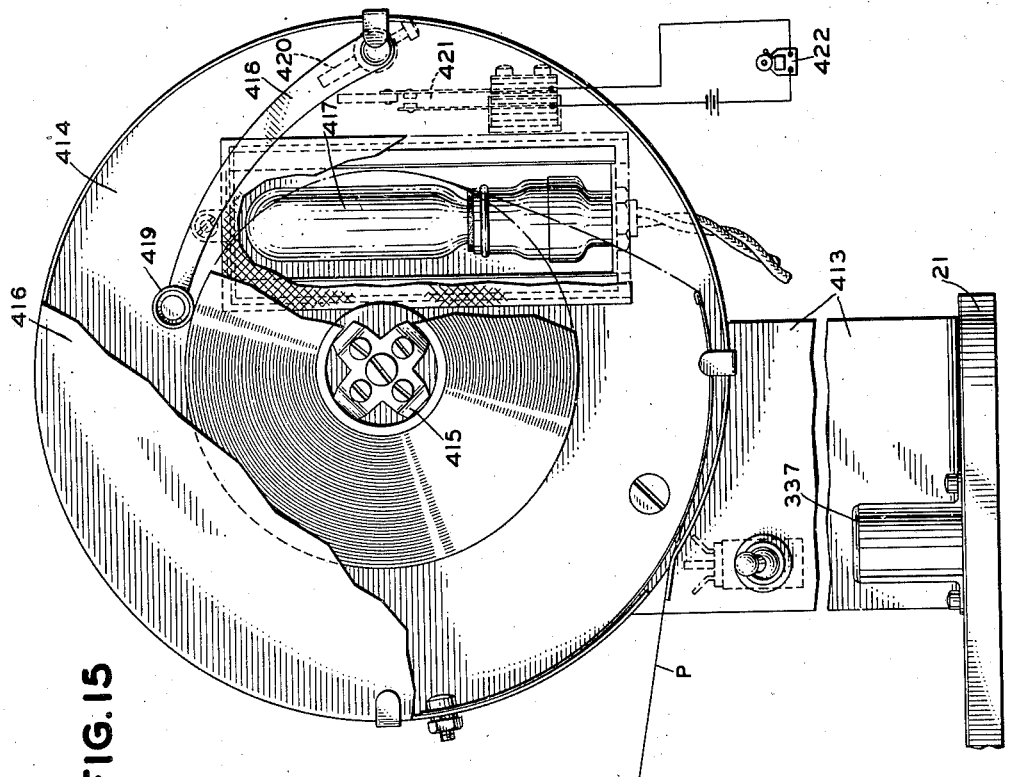
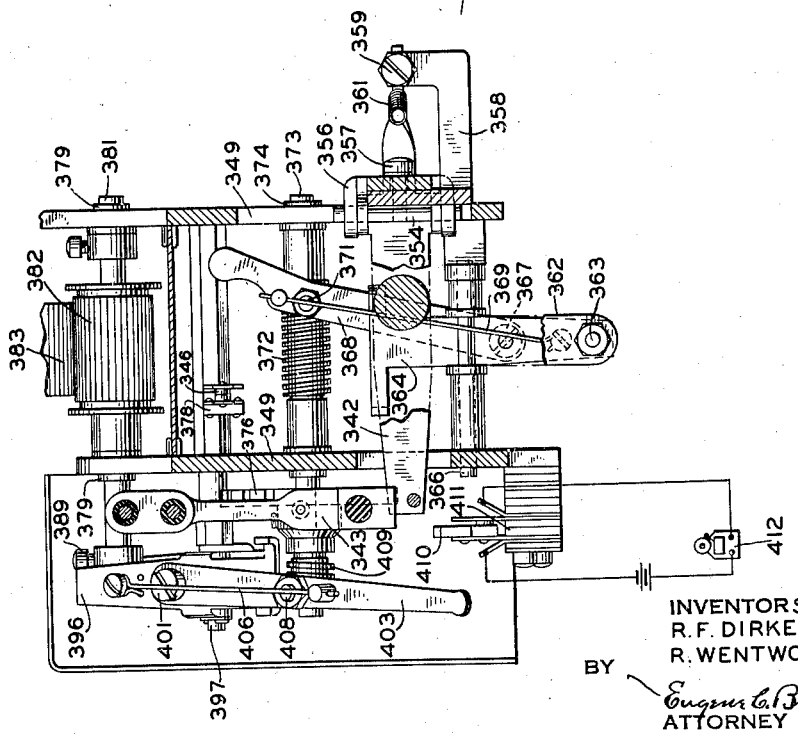

INVENTORS
R. F. DIRKES
R. WENTWORTH
BY Eugene C. Brown
ATTORNEY

UNITED STATES PATENT OFFICE 2,143,828

TELEGRAPH PRINTER-REPERFORATOR

Robert F. Dirkes, Jamaica, N. Y., and Rollins Wentworth, Verona, N. J., assignors to The Western Union Telegraph Company, New York, N. Y., a corporation of New York Application April 6, 1937, Serial No. 135,326

41 Claims. (Cl. 178—92)

This invention relates primarily to telegraph recorders and more particularly to mechanisms of this type for recording received telegraph signals in a printed and/or perforated form on and in a single tape, respectively.

In recent years there has been proposed and developed several automatic and semi-automatic central telegraph office exchange systems. One of these systems, namely, the one disclosed in a copending application of E. R. Wheeler et al., Ser. No. 65,516, filed Feb. 24, 1936, has met with considerable success. The above mentioned system expedites the handling of messages,—where a direct line or channel is not available between the originating and terminating offices, such as for example, where a message originates in a branch office or station connected to a main or central office and must be transmitted from the central office over one or more channels, such as inter-city trunks, to reach its destination,—by relaying the messages received over branch office simplex or start-stop printer channels into inter-city multiplex channels or trunks and vice versa without manual retransmission at the relaying point or points, and reduces the manual operations involved in relaying messages through an intermediate office while at the same time adhering to the present practice of interposing identifying or service signals between messages to facilitate the tracing of lost or mutilated messages which much be repeated.

Heretofore messages originating in a branch office and destined to another branch or central office not adapted to be directly connected thereto have been transmitted to a printer at a local main or central office associated with the originating office by a channel of communication usually adapted for simplex or start-stop service. After being received at the central office, the message in printed form is conveyed by manual and/or mechanical means to an operator assigned to an outgoing trunk or channel extending to the terminating office, whereupon the operator retransmits the message. The message may be thus manually retransmitted several times before reaching its final destination. Obviously, such methods of inter-office message handling involve delays known as "office drag" but possess advantages of permitting monitoring of the service at all times, rapid tracing of lost or mutilated messages, maximum flexibility, rerouting of messages in case of trunk congestion, failure or tie-up, and the proper handling of different classes of services, such as sending full-rate messages ahead of deferred messages. The above mentioned system is designed to include all of these advantages and to eliminate or reduce to a minimum the "office-drag" by allowing retransmission of a message to be initiated before the complete message is received and to decrease the number of operations and operators required at the central offices, thus increasing the speed and efficiency of telegraphic communication and decreasing its cost.

In general terms, the above system has a separate signal storage device associated with or adapted to be associated with each incoming line or channel of communication terminating at a central office. All sending channels connected to a central office have associated or adapted to be associated therewith a mechanism for transmitting signals stored in the signal storage device. At present, tape reperforators and tape transmitters seem to be the most efficient signal storage devices and transmitting mechanisms, respectively, and they are employed in the preferred embodiment of the system, although the system may readily be adapted to operate with other types of storage and transmitting devices. A tape transmitter is usually located in close proximity to a reperforator and a switching means is provided under the control of the operator at the central office whereby the operator, after noting the destination of the message, may connect the transmitter to the proper outgoing channel or communication circuit.

Heretofore, prior to the switching operation, it was necessary for the operator to read the destination of the message from the perforated tape, which operation was more or less difficult, requiring some little time and a knowledge of the code employed. If the operator could have access to a printed record of the message, it would greatly facilitate and speed up the switching operation. A mechanism such as that disclosed in Rothermel Patent No. 1,936,956, dated Nov. 28, 1933, shows means whereby a message may be perforated and printed simultaneously on separate tapes. The mechanism could not be efficiently employed in the above system in that it employed two tapes and required considerable checking of the printed tape against the perforated tape to insure that the transmitter through which the tape passed was associated or switched to the proper outgoing channel. Another machine disclosed in a copending application of R. F. Dirkes et al., Ser. No. 42,692, filed Sept. 28, 1935, shows a means for printing and perforating on a single tape with both recordings registering on a common transverse section of the tape. This machine greatly increased the efficiency of the switching operator in the above system but as both the mechanisms disclosed in the above mentioned patent and application, respectively, were operated by start-stop or simplex signals, they were of no use in conjunction with signals received over a multiplex channel. Obviously, a central office usually has both multiplex and simplex channels terminating and originating thereat.

It is therefore one of the objects of this invention to provide a mechanism whereby multiplex signals or signals received over multiplex channels may be recorded in a printed record and a perforated record on and in a common tape, respectively, and in which both of said recordings register on the same transverse section of the tape.

Another object of the invention is the design of a combined printer-reperforator whereby a large number of the elements thereof may be identical with the elements of other existing telegraphic machines such as, for example, page and tape printers disclosed in copending applications of Long et al., and Kimball et al., Ser. Nos. 34,080 and 46,198, respectively, thus reducing the manufacturing and maintenance costs of the machine to a minimum.

As is well known in telegraph practice, messages are usually sent over telegraph circuits, and especially multiplex circuits, at the maximum possible speeds of the circuit, and when the traffic on a certain circuit is not heavy enough to occupy the full line time of the circuit, the idle line time preferably occurs between messages and not between parts of messages. As a tape transmitter must be at least a predetermined distance away from a reperforator, it is necessary for an operator at the originating point to send a series of blank signals or tape steppers to allow the last perforation of a message to pass through the transmitter. Otherwise, the channel into which the message was being retransmitted would be tied up as the switching operator at the central office could not break down the switching circuit completed when the transmitter was connected to an outgoing circuit until the operator at the originating point sent enough signals of a following message to allow the last perforations of the preceding message to be stepped through the transmitter. Obviously, when messages do not follow each other in rapid succession, the outgoing channel would be tied up a considerable portion of the time and therefore not efficiently used or available for messages received over other incoming circuits.

It is therefore another object of the invention to provide a feed out mechanism operating in conjunction with the above mentioned printer-reperforator and other printers and/or reperforators whereby a predetermined length of tape is advanced after the receipt of the last signal code of a message.

Another object of this invention is to provide an automatic and/or semi-automatic control for the tape feed mechanism mentioned in the above object.

In a reperforator wherein the recording tape must be brought to a full stop during reperforating operations and advanced a definite amount preceding or following each reperforating operation and usually in a very short period of time the feed holes employed by the tape feeding mechanism sometimes rip or tear out. Thus during subsequent operations of the reperforator the tape will not be properly advanced. A considerable length of time may elapse before the attendant becomes aware of such a condition existing and consequently a considerable number of signals may be improperly recorded or lost. It is therefore another object of this invention to provide a control for a signal, such as a bell or signal light, which causes the signal to operate when the tape is not properly feeding through the machine.

From the standpoint of the reperforator mechanism the recording tape best suited therefor is adversely affected by atmosphere conditions such as moisture in the air. It is therefore still another object of this invention to provide a tape reel holder for the supply of tape and a heating element adjacent thereto for heating the tape to expel the moisture therein so that it is supplied to the reperforator in substantially a uniform condition during variable atmospheric conditions.

Still another object of the invention is to provide a mechanism whereby a printer-reperforator such as the one disclosed in the above mentioned copending application of Dirkes et al., Ser. No. 42,692, operable in response to simplex signals, may be readily converted into a printer-reperforator operable in response to multiplex signals or vice versa.

These and other objects and advantages of the invention will appear hereinafter when taken in conjunction with the following detailed description thereof and the appended claims.

As stated above, the invention is intended primarily for use in conjunction with and in response to multiplex signals. Multiplex systems are well known in the telegraph art and a description of the operation thereof is not necessary here, it being sufficient to state that the individual impulses comprising a complete signal are transmitted and received in groups, each group representing a character or signal and being composed of solely character selecting conditions.

This machine is designed to operate in conjunction with a multiplex distributor as is the usual practice in multiplex operation. Five selecting magnets are employed, one for each impulse of the signaling code, and the distributor distributes the impulses to their respective magnets. The impulses to the selector magnets are composed of combinations of current and no-current intervals, their arrangement depending, of course, upon the character to be selected or the function to be performed. Associated with the selector magnets are a series of selector levers, one of the levers being individual to each of the magnets. The levers are selectively positioned in accordance with the operation of the magnets and following the selective positioning thereof a local segment on the multiplex distributor energizes a magnet to release a transfer mechanism. The transfer mechanism transfers the selection set up in the selector levers to a typewheel stop mechanism and to punch pin interponents. Directly following the transfer operation the selector levers are restored to normal and a printing, perforating and tape feeding operation occurs. The printing mechanism comprises a typewheel shaft normally tending to rotate and a drum type stop unit for selectively stopping the rotation of the typewheel shaft and typewheel. The perforating mechanism comprises a series of punch pins and interponents therefor adapted to be selectively interposed between the pins and a rockable member whereby such pins having their associated interponent selectively positioned are selectively actuated to perforate a tape in accordance with the received code combinations of impulses. The tape feeding mechanism co-acts with feed holes invariably perforated in the tape with every operation of the perforating mechanism and intermittently feeds the tape through the machine. An auxiliary tape feed controlling mechanism may be operated to cause the tape feed mechanism to step a predetermined length of blank tape through the machine at the end of a message or upon the cessation of incoming signals. The operation of the auxiliary tape feed control mechanism, in the preferred embodiment, is manually initiated but may be adapted for fully automatic operation.

Individual sub-combinations of mechanisms that perform the related functions of the complete mechanism are arranged, as far as possible, so that they may be easily and readily removed and interchangeably replaced when requiring repairs or adjustments. Thus the replacement of a complete machine is not necessary.

A more complete and thorough understanding of this invention may be had from the following detailed description taken in conjunction with the accompanying drawings showing a preferred embodiment thereof, in which:

Figure 2 is a partial front elevational view of the machine;

Figure 3 is a fragmentary sectional view taken substantialy on line 3—3 of Fig. 1;

Figure 4 is a fragmentary sectional view taken substantially on line 4—4 of Fig. 3;

Figure 5 is a plan view of the mechanism shown in Figure 4;

Figure 6 is a fragmentary sectional view taken substantially on line 6—6 of Figure 2;

Figure 7 is a fragmentary sectional view taken substantially on line 7—7 of Figure 6;

Figure 8 is a fragmentary sectional view taken substantially on line 8—8 of Figure 1, showing a contact and the operating member therefor;

Figure 9 is a plan view of the elements shown in Figure 8;

Figure 14 is a fragmentary sectional view taken substantially on line 14—14 of Figure 1;

Figure 15 is a view partly in elevation and partly in section, showing the tape reel holder and the elements associated therewith;

Drive mechanism

All power for performing the various operations and functions of the machine, with the exception of the minute part supplied by the hereinafter described selector magnets, is furnished by a normally constantly rotating electric motor. This power is applied to the proper elements and at the proper time through appropriate gearing and clutch mechanisms hereinafter described. The arrangement of the driving mechanisms and the main structural parts of the machine will first be described.

Figure 1:
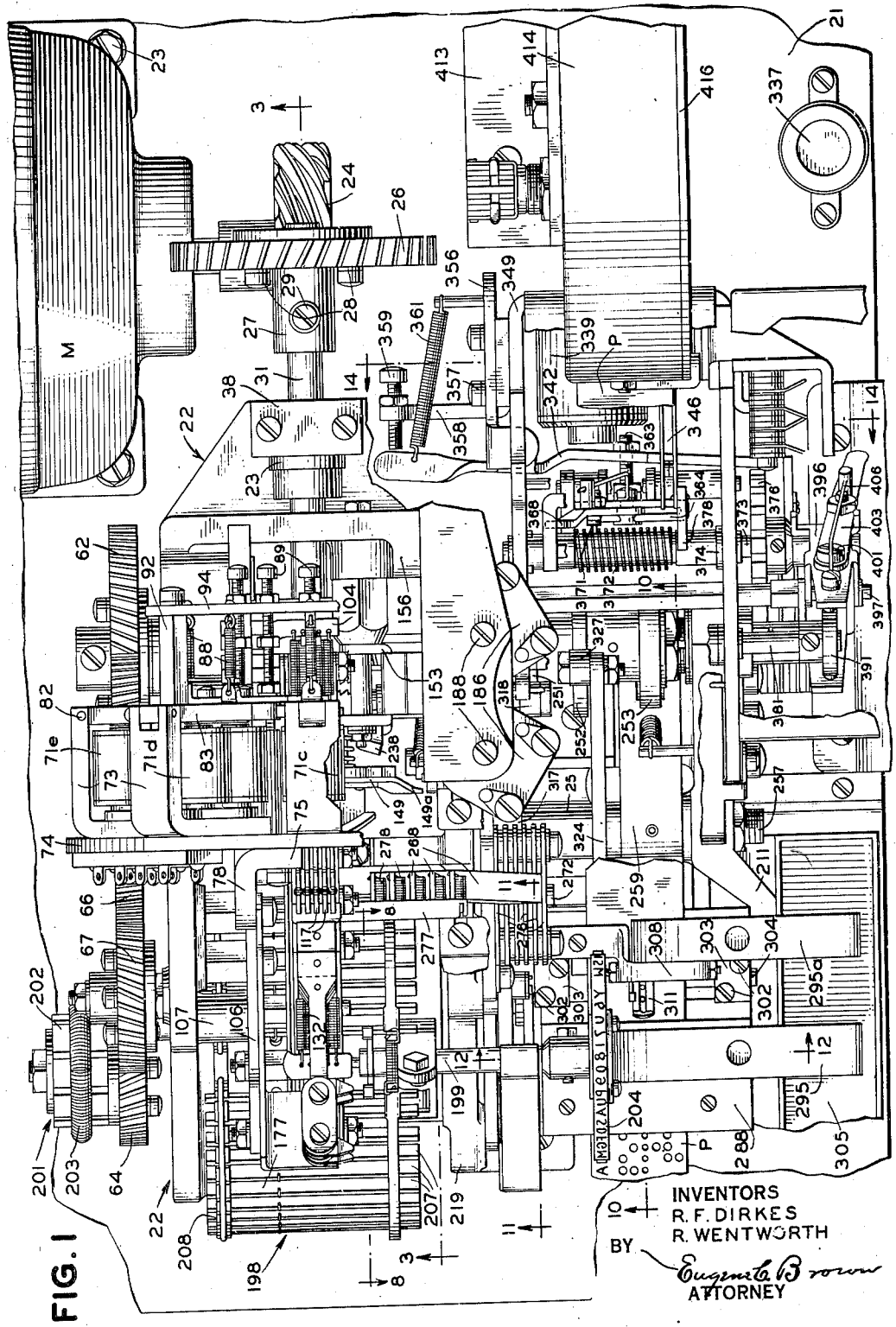
Figure 1 is a plan view of a preferred embodiment of the invention with some of the less important elements broken away in order to more clearly illustrate those of more importance.

Referring first to Fig. 1, a plate 21 comprises the base of the machine and serves as a support for the various elements. A main frame casting 22 is secured to base plate 21 adjacent the rear thereof and in general comprises a vertical plate section extending traversely of the machine with various projections and sections extending therefrom. The main casting will hereinafter be referred to by its reference numeral 22 while specific sections thereof will be referred to by separate reference numerals hereinafter in this specification in order to more clearly designate the section or part referred to.

Figure 16:
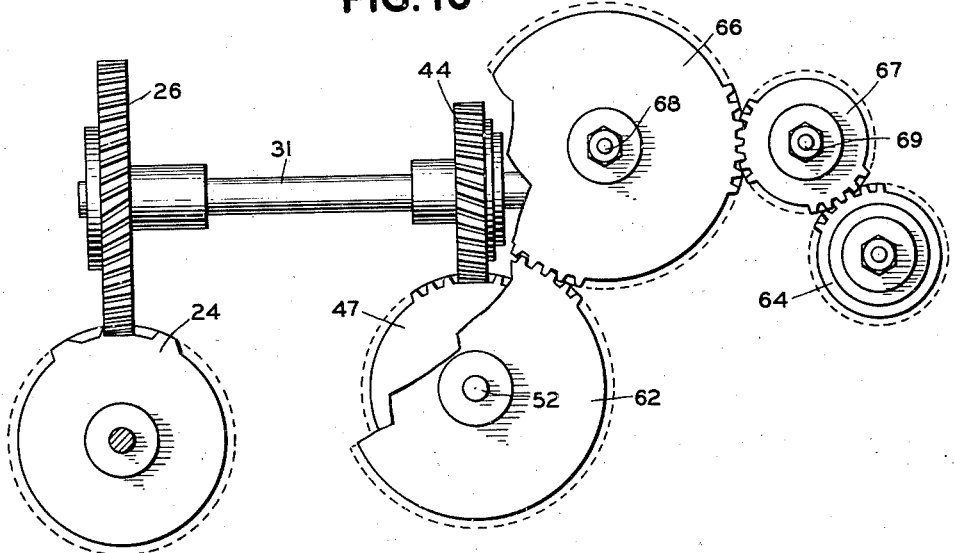
Figure 16 is a schematic view showing the arrangement of the gears as seen from the rear of the machine.

The electric motor M is attached to the base plate 21, at the right hand rear corner thereof, by screws such as 23. The motor shaft has a helical gear 24 secured thereto and meshes with another helical gear 26 located directly above. The gear 26 is secured to a flanged hub 27 by screws 28 and the hub 27 is secured by a screw 29 to a transfer cam shaft 31 for rotation therewith. The transfer cam shaft 31, best shown in Fig 3, is journaled at its left hand end and adjacent its right hand end in flanged bushings 32 and 33, respectively. The bushings 32 and 33 are supported in sections 34 and 36 of the main frame casting 22 and are clamped in place by bushing clamping members 37 and 38, which in turn are held by screws 39 and 41, respectively. At about the center of the transfer cam shaft 31 is a hub 42 secured thereto for rotation therewith by a set screw 43. A helical gear 44 is secured to the hub 42 by screws 46 and meshes with another helical gear 47 located directly below. The gear 47 is fixed to a flanged hub 48, Fig. 6, for rotation therewith, by screws 49, the hub 48 being secured by a pin 51 to the right hand end of a counter shaft 52. The counter shaft 52 is journaled in flanged bushings 53 and 54 which are held in sections 56 and 57, respectively, of the main frame casting 22, by bushing clamping members 58, one of which is shown dotted in Fig. 3. Fixed by a screw 59, Fig. 6, to the left hand of the counter shaft 52 for rotation therewith is a gear hub 61 which carries a spur gear 62 by means of screws such as 63. Motion is transmitted from the gear 62 to a typewheel shaft gear 64, Fig. 16, by means of two idler gears 66 and 67, which are pivotally supported on two studs 68 and 69 respectively in the plate section 56 of the main frame casting. The typewheel shaft gear 64 serves to rotate the typewheel shaft through a slip friction clutch as will be hereinafter described. Thus power from the electric motor M is transmitted to the various shafts of the machine and the manner in which the power is transferred from the various shafts to the elements will be described in following paragraphs in connection with the description of these elements.

Selector

The arrangement and operation of the elements comprising the selector mechanism will first be described. The means responsive to the received electrical impulses comprises a plurality of electric selector magnets. There is a separate magnet for each impulse of the signaling code and as this machine is designed to operate under the control of a five unit multiplex signaling code, there are consequently five separate selector magnets. A distributor mechanism is employed to distribute the signaling impulses received over the receiving line to their respective magnets and in general the distributor mechanism functions to successively and sequentially connect the selector magnets to the line in synchronism with the incoming line signals whereupon the selector magnets are actuated in accordance therewith. The distributor mechanism also furnishes local impulses for timing and initiating the operation of various other elements of the recorder as will be hereinafter described. The distributor mechanism in itself comprises no part of the invention and therefore no part thereof is further described or shown in the drawings other than the schematic arrangement of some of the segments of the face plate shown in Fig. 17, which is thought to be sufficient for a complete comprehension of the invention.

The five above mentioned selector magnets 71a to 71e, Figs. 1, 2 and 3, each comprise two coils. The magnets are arranged in substantially a semi-circle with the axis of the semi-circle extending transversely of the machine. The magnets 71a and 71b are omitted in Fig. 1 in order to more clearly illustrate the elements located beneath them but their arrangement is clearly shown in Fig. 2. Each selector magnet assembly 71a to 71e comprises duplicates of the elements shown associated with the magnet 71c in Fig. 3, the arrangement of which will now be described, and the duplicate elements will be hereinafter referred to by a common reference numeral. A magnetic yoke 72 supports the coils 71c and is in turn supported by a selector magnet mounting bracket 73. The bracket 73 is secured to a semicircular plate 74 by a screw 76. The plate 74 is attached by screws 77 to a right angle flange 75 of a selector unit mounting plate 78, which in turn is attached by screws 79 to the top of the main frame casting 22. The screws 79 extend through elongated slots, such as 81, in the plate 78 and thereby permit relative adjustment of the plate with relation to the main frame casting 22. A shoulder screw 82 at the right hand end of the selector magnet mounting brackets 73 pivotally supports an armature 83. The armature 83 is in operative relation with the pole pieces of the magnet coils 71c and has threaded in the movable end thereof a screw 84. A nut 86 on the screw 84 clamps an armature hammer 87 to the armature. A spring 88 attached to the armature hammer 87 tends to keep it and the armature in their retracted position with the head of the armature screw 84 in contact with the end of an adjustable screw 89. The screw 89 thus serves as an adjustable back stop for the armature 83. The head of a post 91, supported in the plate 74, cooperates with the end of the armature screw 84 to limit the movement of the armature in its energized position. Each of the selector magnets 71a to 71e has a like arrangement of elements associated therewith and in Figs. 1, 2 and 3, it can be seen that the magnet 71c is mounted on the plate 74 in a vertical position, the magnets 71b and 71d being mounted at an angle of 45 degrees thereto and the magnets 71a and 71e being mounted horizontally with the armatures 83 and armature hammers 87 of all the magnets converging toward a common center, as shown in Fig. 6. Two posts 92, Figs. 2 and 3, secured to the plate 74, extend horizontally to the right therefrom and have attached to their right hand ends, by screws such as 93, a semicircular plate 94. The plate 94 supports the above mentioned armature back stop adjusting screws 89 and the armature retractile springs 88.

The free ends 95 of the armature hammers 87, Fig. 3, are bent horizontally toward the left and each is in operative relation with an associated selector lever latch 96. The latches are indicated in general by reference numeral 96 in Fig. 3 and are pivotally mounted in a substantially vertical position, one behind the other, on a stud 97, Figs. 3 and 6, extending horizontally toward the front of the machine from the selector unit mounting plate 78. The upper ends of the latches 96 are kept in alignment with the ends 95 of their respective armature hammers 87 by guide plates 98. The guide plates 98 are mounted on two studs 99 extending from the plate 78 parallel with the latch pivot stud 97. The guide plates 98 are spaced along the studs 99 by spacers 101 intermediate with the plates 98 and as the spacers are slightly thicker than the latches 96, free pivoting movement thereof is permitted between the guide plates. Nuts 102 in threaded engagement with the ends of the studs 99 clamp the guide plates 98 and the spacers together and in position. Individual springs 103 attached to the latches 96 and to a spring post 104 tend to rock the latches in a clockwise direction, as shown in Fig. 3, and keep the lower ends thereof engaged with their associated selectors as will be hereinafter described.

Referring to Figs. 1, 2, 3 and 6, a selector unit mounting plate 106 is secured in a vertical position to bosses 107, extending horizontally from adjacent the upper part of the main frame casting 22, by screws 108. A series of studs 109a to 109h extend horizontally from the front of the mounting plate and have spaced thereon, by spacers 112, a plurality of similar selector lever guide plates 111. Nuts 113 in threaded engagement with the end of the studs 109 clamp the guide plates 111 and spacers together and in position. In the spaces formed between the guide plates 111 by the spacers are a series of multi-armed selector levers 114. The selector levers 114 are arranged one behind the other and are slightly thinner than the spacers 112. Therefore, free movement thereof between the guide plates 111 is allowed and they are not rigidly attached to the selecting unit or pivoted at any one point but slide between the guide plates 111, being restrained and guided in their movements by springs, guide pins and the spacers 112 on the studs 109. There are five selector levers 114, one for each of selecting magnets 71 and are operatively associated therewith by means of the selector lever latches 96. The sectional view, Fig. 3, clearly shows the arrangement of one of the selector levers 114, the others being similarly located in front of and behind the one shown. Individual vertically disposed springs 116 attached to a leftwardly extending arm 117 of each of the selector levers 114 tend to move them in a downward direction. Another set of individual horizontally disposed springs 118 attached to rightwardly extending arms 119 of each of the selector levers 114 exert a substantially horizontal force thereon. The springs 116 and 118 are anchored in spring posts 121 and 122, respectively. The tension of the springs 116 and 118 are such relative to one another that they cooperate with each other and with the selector levers 114 to keep the left face of an upwardly extending section 123 thereof in engagement with the spacer 112 on the stud 109a, the right face of a depending section 124 of the levers in engagement with the spacer 113 on the stud 109c, and the bottom face of a rightwardly extending section 126 in engagement with the upper face of a leftwardly extending projection 127 on the depending section of associated selector lever latches 96. A selector lever 114 is shown in Fig. 3 in its normal or unselected position by the full outline thereof and in its selected position by the dot-dash outline, it being moved from one position to another as will be hereinafter described. The selected position of a selector lever 114 thus shown in dot-dash outline will be hereinafter referred to as its unoperated selected position to distinguish from its operated selected position hereinafter described.

Also, in the spaces formed between the guide plates 111 are a series of five horizontally disposed transfer levers 128, one associated with each of the selector levers 114 and in the same vertical plane. The transfer levers 128 are adapted to move in a horizontal direction between predetermined limits as will be described, being guided at their right hand ends by the spacers 112 on the studs 109d and 109e. The left hand bifurcated ends of the transfer levers 128 are guided by the spacers on the stud 109e. A series of jockey levers 129, one associated with each of the transfer levers 128, are pivotally mounted on a stud 131 extending from the selector unit mounting plate 106. Individual springs 132 secured to the jockey levers 129 and anchored to a spring post 133 tend to rock the levers in a counter-clockwise direction and keep a wedge-shaped projection 134 on the leftwardly extending arm thereof in engagement with a similar projection 136 extending from an associated transfer lever 128. Thus the transfer levers 128 are biased in one or the other of their two operated positions hereinafter described.

Loosely mounted adjacent the left hand end, Fig. 3, of the transfer cam shaft 31 is a sleeve 137. The sleeve abuts, at its left and right hand ends, the bushing 32 and the gear hub 42 respectively. Pinned to the sleeve 137 for rotation therewith by pins 138 is a transfer cam hub 139. Loosely mounted on the sleeve 137 and at the right of the cam hub 139 is a flanged collar 141. The collar 141 is slidable along the axis of the sleeve 137 but is at all times operatively engaged with the hub 139 to rotate therewith by means of interengaging tongues 142 and grooves 143, Fig. 5, formed on and in the hub 139 and collar 141 respectively. A series of radial teeth 144, Figs. 3 and 5, disposed on the right hand face of the collar 141 are in operative relation with a series of similar teeth 146 disposed on the left hand face of the gear hub 42. Normally, the teeth 144 and 146 are held disengaged as will be hereinafter described against the action of a compression spring 147 coiled about the grooved portion of the collar 141 and disposed between the flanges on the collar and the hub 139. Attached to the flange of the hub 139 for rotation therewith by screws 148, Figs. 3, 4 and 5, is a disc cam 149, hereinafter referred to as the transfer cam. A section 149a, Figs. 4 and 5, of the transfer cam 149 is displaced along the axis of rotation of the cam and performs the selector lever transfer operation, as will be hereinafter described. An angular member 151 hereinafter referred to as the gathering cam, having a surface at an angle to the axis of rotation of the transfer cam 149 is riveted to a side of the cam 149 for rotation therewith. Another member 152 hereinafter referred to as the selector lever reset cam is riveted to the other side of the transfer cam 149 for rotation and the three cams, namely, the transfer cam 149, the gathering cam 151 and the reset cam 152, are hereinafter referred to as the transfer cam assembly.

The manner in which the rotation of the transfer cam assembly is initiated for one revolution and stopped after each revolution will now be described. Referring to Figs. 1, 2 and 6, a transfer cam assembly trip lever 153 is pivotally mounted on a stud 154 extending horizontally from a section 156 of the main frame casting 22. The depending part of the trip lever 153 has at its lower end a cam follower 157, Figs. 3, 5 and 6, which is adapted to associate with a side cam surface 158 formed on the collar 141 associated with the transfer cam hub 139. Assume that the teeth 144 and 146 are disengaged as shown in Figs. 3 and 5, and that the trip lever 153 is actuated by means hereinafter described to cause the disengagement of the side cam surface 158 and the cam follower 157. Thereupon the spring 147 causes the collar 141 to slide to the right in Fig. 3 to bring the teeth 144 thereon into engagement with the teeth 146 on the gear hub 42. As hereinbefore described, the gear hub 42 is normally rotating and as the teeth 144 and 146 engage, the collar 141 and the transfer cam assembly will rotate therewith. Before the collar 141 and transfer cam assembly has completed a full revolution, a spring 159 is allowed to return the trip lever 153 to its normal position and the end of the cam follower 157 rides on the circumference of collar 141 and in the path of the side cam surface 158. Therefore, when the collar has nearly completed a revolution, the cam follower 157 and the side cam surface 158 engage. Further rotation of the cam 158 causes the collar to slide to the left, in Fig. 3, and bring the teeth 144 out of engagement with the rotating teeth 146. The inertia of the collar 141 and cam assembly cause them to continue to rotate a few degrees to bring a section of the side cam surface 158 which is substantially at right angles to the direction of rotation into engagement with the cam follower 157 and thereby stops further rotation of the collar 141. Thus the trip lever 153 initiates the transfer cam assembly into rotation and stops the rotation thereof after each revoltuion. The end of a lever 161, Fig. 4, which is pivoted on a shoulder screw 162 supported from the section 34 of the main frame 22 cooperates with a lug 163 riveted to the transfer cam 149 to prevent rebound or rotation in a reverse direction of the transfer cam assembly due to its sudden stop by the trip lever 153. A spring 164 is attached to the lever 161 to hold it in the path of the lug 163.

Figure 17:
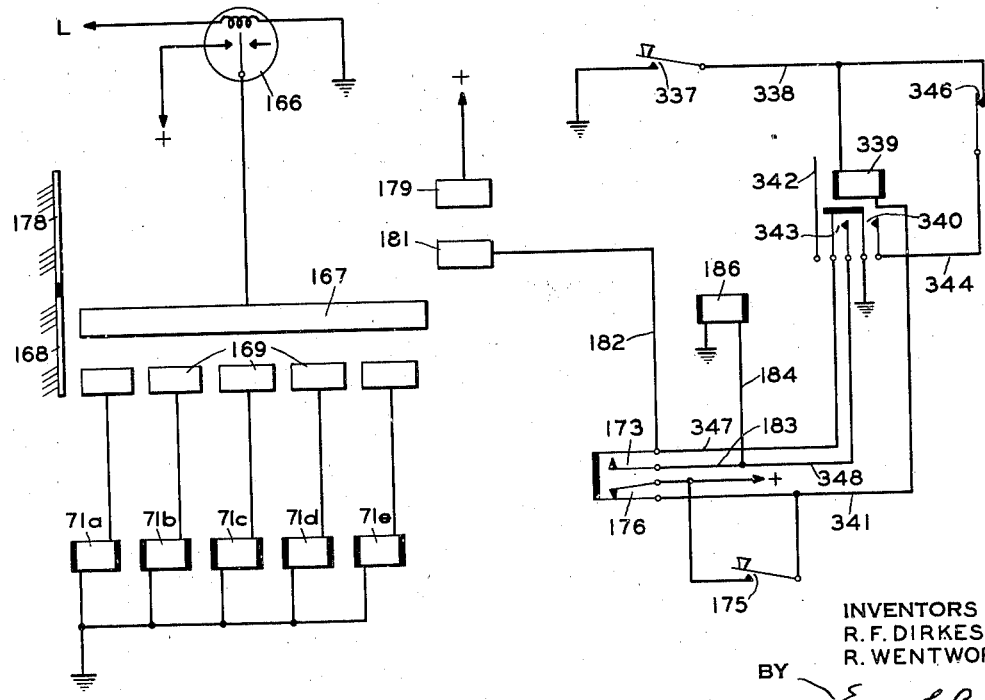
Figure 17 is a wiring diagram showing the manner in which the various electrical elements associated with and controlling the machine are interconnected.

The combined operation of the selector magnets 71, the selector lever latches 96, the selector levers 114, the transfer levers 128 and the transfer cam assembly will now be described. In Fig. 17 a multiplex line circuit L is shown connected to a differential polar relay 166 which is adapted to operate in response to the signals received over the line. As is the usual practice in multiplex systems, the signals received over the line L comprise impulses of negative and positive current and by means of the relay 166 are changed into impulses of current and no-current. The impulses of current and no-current are applied to a solid ring 167 of the multiplex distributor and a brush 168 rotating in synchronism with the received signals successively connects a series of five segments 169 to the solid ring. Each one of the five segments 169 is connected to an associated one of the five selector magnets 71a to 71e. The other sides of the magnets 71 are grounded and therefore as the brush 168 sequentially contacts the segments 169 the magnets will be energized or remain deenergized in accordance with the signals received over the line. As one of the selector magnets, such as 71c in Fig. 3 is energized, the armature 83 thereof is caused to pivot in a clockwise direction. As the armature 83 pivots the lower end 95 of the attached armature hammer 87 engages the upper end of an associated selector lever latch 96 and causes it to pivot in a counter-clockwise direction. As the selector lever latch 96 pivots, the upper face of the leftwardly extending projection 127 at the lower end thereof moves to the right and out of engagement with the bottom face of the arm 126 of the associated selector lever 114. Thereupon the spring 116 attached to the selector lever 114 moves it downward in a substantially vertical direction to bring the arm 117 into engagement with the pin 169 extending from the mounting plate 106 which thereby limits its downward movement. A selector lever 114 thus positioned is shown by the dotted outline thereof in Fig. 3 and such positioned levers are hereinafter referred to as being selectively positioned as compared to selector levers in their normal or unselected position shown by the full outline thereof. In the same manner impulses received on the other of the selecting magnets 71 causes their associated selector levers 114 to be selectively positioned. If an impulse of no-current is applied to the solid ring Fig. 17 as the brush 168 contacts one of the segments 169, the associated magnet 71 will not be energized and therefore the corresponding selector lever 114, Fig. 3, will remain latched in its unselected position. Thus the selector levers 114 remain in their unselected position or are moved into their selected position in a combination representative of the received line signals. The selected and unselected positions of the selector levers 114 correspond to spacing and marking impulses respectively.

The depending section 171 of each of the selector levers 114 is bifurcated and as the unlatched levers move into their selected position, the bifurcated ends thereof straddle the disc transfer cam 149. The unselected selector levers 114 remain in their normal position with their bifurcated ends 171 out of engagement with the transfer cam 149. Another function is performed, as any one or more of the selector levers 114 move into their selected position, by the leftwardly extending arm or arms 117 coming into engagement with a small plate 172 extending beneath the left hand ends of the arms 117. The plate 172 is insulatively supported by one spring of a normally open spring contact 173 and as any arm 117 engages the plate 172, the contact spring is moved to close the contact 173. The plate 172 in moving downward engages a stud 174 insulatively supported by a spring of a normally closed spring contact 176 and causes this contact to open. Thus the contact 173 is closed and the contact 176 is opened whenever any one or more of the selector levers 114 move into their selected positions and contacts 173 and 176 remain thus operated until the selected selector lever or levers 114 are returned to their normal position as will be hereinafter described. The contacts 173 and 176 are insulatively and adjustably supported by a bracket 177 which is held in position by the screws 108.

Following the positioning of the selector levers 114 in response to a combination of received impulses and while the brush 168 is contacting segments associated with another channel of the multiplex circuit, another brush 178, Fig. 17, contacts two segments 179 and 181. The segment 179 has battery applied thereto and the brush 178 contacting it completes a circuit therefrom, through the brush 178 and segment 181, over a conductor 182, through the at this time closed contact 173, over conductors 183 and 184 and through the coil of a transfer cam assembly trip magnet 186 to ground, thus momentarily energizing the magnet. The trip magnet 186 together with its yoke 187, Figs. 2 and 6, is attached, in a vertical position, by screws 188, to a bracket 189. The bracket 189 is in turn adjustably attached by screws 191 to the section 156 of the main frame casting 22. The armature 192 of the magnet 186 is attached to the horizontal section of the transfer cam assembly trip lever 153 and when the magnet is energized, the trip lever 153 is caused to pivot in a counterclockwise direction as shown in Fig. 6. As the trip lever 153 pivots, it causes the cam follower 157 on the depending end thereof to be disengaged from the side cam surface 158, Fig. 3, whereupon the transfer cam assembly rotates with the continuously rotating gear hub 42 as hereinbefore described. The gear hub 42 rotates at a faster rate than the brush 178, Fig. 17, and therefore the transfer cam assembly will have completed one revolution and be stopped in its normal rest position before the trip magnet 186 is again energized.

After the transfer cam assembly has rotated a few degrees from its rest position, the gathering cam 151, Figs. 2 to 5, comes into operative relation with depending sections 193 at the right hand end of the transfer levers 128. Due to the rotation of the transfer cam 151 and the shape thereof, it successively causes all of the transfer levers 128 that happen to be in their left hand position to slide to the right into their right hand position. All or none or any number of the transfer levers 128 may be in their left hand position depending upon the previous character selected. As the transfer cam assembly rotates, the transfer cam disc 149 slides in the bifurcated ends 171 of the selected selector levers 114. A few degrees of rotation of the transfer cam assembly after a transfer lever 128, such as the first one, has been returned to its right hand position, the displaced portion 149a of the transfer cam 149 comes into operative relation with the bifurcated end 171 of an associated selector lever 114. If the first selector lever 114 happens to be one of the selected selector levers 114 and is therefore straddling the transfer cam disc 149, the continued rotation of the transfer cam will allow the displaced portion 149a thereof to move the lower bifurcated end 171 of this selector lever to the left, Fig. 3, an amount equal to the displacement of the displaced section 149a. The movement of the bifurcated end 171 of the selector lever to the left causes the complete selector lever to pivot in a clockwise direction with the section of the arm 117 thereof in contact with the pin 169, acting as a pivot point, and such pivoted positions of the levers will hereinafter be referred to as their operated selected positions.

As the bifurcated end 171 of a selector lever 114 moves to the left or into its operated selected position, the left hand side thereof engages with the right hand end of the associated transfer lever 128 and causes the transfer lever to slide from its right hand position into its left hand position. In the same manner any other of the selected levers 114 cause their associated transfer levers 128 to be moved into their left hand position. It is obvious that when a selector lever 114 is in its normal position and the bifurcated end 171 thereof is, therefore, not straddling the transfer cam disc 149, the displaced portion 149a of the disc will have no effect on such selector levers. Thus a selection represented by the selector levers 114 being in selected and unselected positions is successively transferred to and represented by the transfer levers 128 being in their left and right hand positions respectively. As the displaced portion 149a of the transfer cam causes the selected selector levers 114 to pivot in a clockwise direction, the associated springs 116 and 118 attached thereto are tensioned. Therefore, as the displaced portion 149a rotates out of operative relation with the bifurcated ends 171 of these selected selector levers, the springs 116 and 118 are allowed to pivot the selector levers in a counter-clockwise direction to return them to their unoperated selected position, the spring 118, of course, supplying the greater portion of the power therefor. As the displaced portion 149a rotates out of operative engagement with the selected selector levers 114, the reset cam 152, Fig. 4, comes into operative relation therewith. The leading edge 152a of the reset cam 152 is beveled in such a manner that as it rotates, the beveled edge 152a successively engages the bottom of the right hand section, Fig. 3, of the bifurcated ends 171 of the selected selector levers 114 and due to the rotation thereof, causes all the selected selector levers to move upward in a vertical direction. When the bottom of the arm 126 of a selector lever is high enough to clear the top of the leftwardly extending projection 127 of the associated selector lever latch 96, the attached spring 103 pivots the latch to allow it to latch the selector lever in its normal or unselected position as the reset cam 152 subsequently rotates out of operative relation with the bottom of the selector lever. Thus the selected selector levers 114 are successively returned from their unoperated selected position to their unselected position ready to be reselected or left unselected in accordance with the succeeding combination of impulses.

In the preferred embodiment of the invention, the arrangement of the transfer cam assembly is such that the return of the transfer levers 128 to their right hand position, the transfer operation of the selection set up in the selector levers 114 to the transfer levers and the resetting of the selected selector levers to their normal position occur in overlapped relation; i. e., the transfer operation starts to take place before the last transfer lever 128 has been returned to its right hand position and resetting of the selected selector levers 114 starts to take place before the completion of the transfer operation. Such an arrangement lends itself to smooth operation and leaves a maximum time available for other operations such as printing, perforating and tape feeding as will be hereinafter described.

In brief review, the selecting operation cycle is as follows: the signaling impulses comprising solely character selecting impulses are sequentially received over a multiplex circuit and by means of a multiplex distributor are distributed to the selecting magnets, such as 71a to 71e associated with one of the multiplex channels; the selecting magnets operate or remain unoperated in accordance with the received signals, and when operated cause associated latches, such as 96, to unlatch associated selector levers 114 which thereupon move to unoperated selected positions. A transfer cam assembly released for rotation in timed relation with the received impulses first returns all the transfer levers 128 to their normal position and then actuates the selected selector levers 114 from an unoperated selected position to an operated selected position and thereby transferring the selection set up in the selector levers to the transfer levers. The operated selector levers are next returned to their unoperated selected positions and subsequently returned to their normal or unselected position ready for the next selection.

Type wheel stop unit

The manner in which the transfer bars 128 are adapted to selectively control the printing and perforating operations will now be described. Depending from adjacent the left hand end of each of the transfer levers 128, Fig. 3, are rounded projections 194 which are engaged in radial slots 196 of associated code disc 197. The discs 197 are five in number, corresponding to the number of selector levers 114 and transfer levers 128 and comprise the selecting elements of a drum type typewheel stop unit indicated in general at 198 in Figs. 1, 2, 3 and 8. This general type of typewheel stop unit is old in the art and the details of this particular embodiment are fully described in the above mentioned copending application Ser. No. 34,080, and it is thought that a complete description herewith is not necessary. In general, the typewheel stop unit 198 comprises a set of five differently notched code discs 197 which are rotatable from one of two positions to the other by the transfer levers 128 as the transfer levers are moved from their right hand position, Fig. 3, to their left hand position or vice versa, by the gathering cam 151 and transfer cam 149. A typewheel shaft 199 extends through the center of the code discs 197 and constantly tends to rotate due to a rotative force communicated thereto from the heretofore described continuously rotating gear 64 through a slip friction clutch indicated in general at 201, Fig. 1. The slip friction clutch comprises a plurality of segments 202 composed of suitable friction material, such as Bakelite, which are adapted to rotate with the gear 64 and are frictionally engaged with the periphery of a collar, not shown, secured for rotation therewith to the typewheel shaft 199. A circular coiled radially contractible spring 203 holds the segments 202 frictionally engaged with the collar secured to the typewheel shaft Fixed to the front end of the typewheel shaft 199 for rotation therewith is a typewheel 204, Figs. 1 and 2, which has in a single row, on the periphery thereof, both upper and lower case characters. Also fixed to the typewheel shaft 199 for rotation therewith is a typewheel shaft stop arm 206, Fig. 3, the end of which is adapted to rotate in operative relation with the front ends of a series of stop elements 207. The stop elements 207 are at right angles and equally spaced about the circumference of the code discs 197 and are guided in radial slots in two guide plates 208 and 209, Figs. 1 and 3, adjacent the two ends of the stop elements. The code discs 197, Fig. 3, located between the guide plates 208 and 209 have V-shaped notches formed on the periphery thereof and when the discs are selectively positioned by the transfer levers 128, a notch in each disc will be in alignment with a notch in each of the other discs, the notches in the discs being formed in a manner well known in the art so that a single row of notches exists for each setting combination thereof. The stop elements 207 are urged into engagement with the code discs 199, by individual springs not shown, and when a row of notches exists in the discs, the associated stop element is moved by its attached spring into the row of notches and thereby places the front end thereof in the path of the stop arm 206. As the stop arm 206 rotates, the end thereof engages the thus selected stop element 207 and further rotation of the stop arm is stopped thereat. As the typewheel 204 and stop arm 206 rotate together, the typewheel is thereby stopped in a selected angular position with a character on the periphery thereof in operative relation with the printing mechanism hereinafter described. A sixth disc called a "shift" disc is actuated from one of two positions to the other by one or the other of two special stop elements. These two stop elements are selected in response to signals corresponding to case shift and unshift signals and causes the shift disc to be positioned so that all signals received after a case shift signal will be properly recorded. Thus the number of selections ordinarily available with a five unit code is increased to be nearly equal to that of a six unit code in accordance with standard telegraph practice, although all possible selections are not utilized in the embodiment shown. The stop arm 206 remains engaged with a selected stop element 207 until the code discs are repositioned to normal as the gathering cam 151 returns all the selected transfer levers 128 to their right hand position in conjunction with the selection and transfer of the following character. As the code discs 197 are returned to normal, an edge of the V-shaped notch is one or more of the discs engages the selected stop element and due to the rotating movement of a disc, the stop element is cammed out of its selected position. The stop arm 206, the typewheel shaft 199 and the typewheel 204 are thereby released to rotate with the slip friction clutch 201 until the stop arm engages another stop element 207, selected by a new combination of settings of the code discs 197 in response to a new code combination of impulses.

*Printing, perforating, and tape feeding*

The printing, perforating and tape feeding operations are each controlled by individual rotatable cams and a description of the structural relation and operation of their associated mechanism will now be given.

Referring to Figs. 1, 2, 6 and 10, an offset bracket casting 211 is shown attached to the front side of the section 212 of the main frame casting 22 by screws such as 213. Clamped to the vertical right hand edge of the bracket 211 by screws 214, Figs. 2 and 6, is a bushing clamping member 216, which clamps a bushing 217 in place. A similar bushing clamping member 218, Figs. 6 and 7, is secured to a section 219 of the main casting by screws 221 and clamps a bushing 222 in place. Journaled in the bushings 217 and 222 is a so-called operating shaft 223. The shaft 223 and the hereinbefore mentioned countershaft 52 are on the same axis and the shaft 223 is adapted to be independently rotated from said continuously rotating countershaft by means of a hereinafter described ratchet clutch similar in construction and operation to the ratchet clutch comprising the toothed gear hub and collar 42 and 141, Fig. 3, respectively. Pinned to the left hand end of the shaft 223, Fig. 6, for rotation therewith by a pin 226 is a sleeve 224 and pinned to the seleve 224 for rotation therewith by pins 227 is a collar 228. Loosely mounted on the left hand end of the sleeve 224 is a collar 229 which is operatively engaged with the collar 228 and adapted to be at all times rotatable therewith by means of interengaging tongues 231 and grooves 232 on and in the collars 229 and 228 respectively. Thus the collar 229 is adapted to rotate with the shaft 223 but is slidable along the axis of the shaft to bring teeth 233 on the left hand face thereof into and out of engagement with similar teeth 234 disposed on the right hand face of the continuously rotating gear hub 48. A side cam surface 236, Figs. 6 and 7, formed on the circumference of the collar 229 is adapted to operatively engage a cam follower 237 on the lower end of an operating shaft trip lever 238. The trip lever 238 is pivotally mounted on a stud 239 extending from the section 219 of the main casting and a spring 241 secured to the trip lever normally holds the cam follower 237 engaged with the side cam surface 236 or in the path thereof. The upper end of the trip lever 238 is adapted to be engaged with a pin 242 located on the transfer cam assembly hub 139. After about three-quarters of a revolution of the transfer cam assembly from its normal stop position the pin 242, Figs. 4, 5 and 7, engages the trip lever 238 and causes it to pivot in a counterclockwise direction, Fig. 7, and thereby withdraw the came follower 237 from engagement with the side cam surface 236. A compression spring 243, Fig. 6, coiled about the collar 228 thereupon slides the collar 229 to the left, bringing its teeth 233 into engagement with the teeth 234 of the rotating gear hub 48 and thereby causing the collar 229 and shaft 223 to rotate. The trip lever 238 is tripped momentarily and the spring 241 immediately returns the lever to its normal position with the cam follower 237 riding on the periphery of the collar 229 and in the path of the side came surface 236. As the collar 229 completes a revolution the cam follower 237 and side cam surface engage and the collar is cammed to the right, bringing its teeth out of engagement with the teeth of the rotating gear hub 234. A further projection of the cam surface 236 substantially parallel to the axis of the shaft 223 then engages the cam follower 237 and brings the collar 229 and shaft 223 to rest in their normal rest position. The end of a lever 244, Figs. 6 and 7, pivoted on a shoulder screw 246 suported from the frame section 219 engages with a radial shoulder 247 on a flange of the collar 228 in the normal rest position of the shaft 223 and prevents rebound or rotation in a reverse direction of the shaft assembly due to its sudden stop. Thus the shaft 223 is rotated for one revolution in conjunction with each rotation of the transfer cam assembly and the relative speeds of rotation thereof are such that the shaft 223 is in its rest position whenever its trip lever 238 is actuated. The central portion of the shaft 223 has pinned thereto by a pin 248 for rotation therewith a sleeve 249. A group of three disc cams 251, 252 and 253 intermediate with spacers 254 are clamped together and against a flange of the sleeve 249 for rotation therewith by a nut 256 in threaded engagement with the threaded right hand end of the sleeve. The three disc cams 251, 252 and 253 are hereinafter referred to as the tape feed cam, the print cam and the perforating cam respectively and their operation will now be described.

Figure 10:
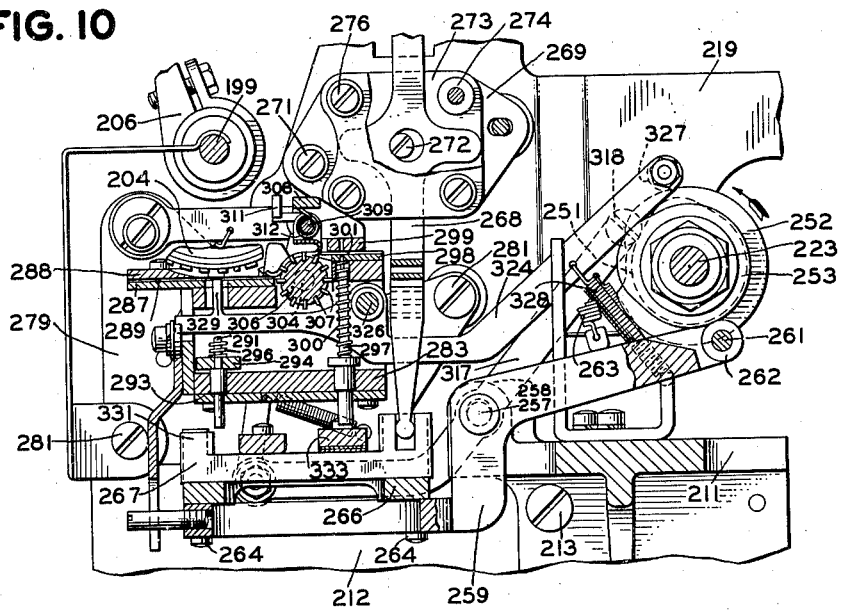
Figure 10 is a fragmentary sectional view taken substantially on line 10—10 of Figure 1.

A rod 257, Figs. 2 and 10, is suported at its front end in the front section of the bracket 211 and at its rear end by a boss 258 forming a part of the bracket 211. Pivotally mounted on an eccentric portion of the rod 257 is a perforating lever 259. The right hand end of the perforating lever 259, Fig. 10, carries a screw 261 upon which is pivotally mounted a roller cam follower 262 in alignment with the perforating cam 253 and which is held in engagement therewith by a spring 263 secured to the perforating lever. The left hand end of the perforating lever 259 is substantially horizontal and has attached to the upper side thereof, by screws 264, a substantially H-shaped block 266. Disposed in five longitudinal slots in the block 266 and adapted to slide back and forth therein are five similar punch pin interponent bars 267. The right hand ends of the interponent bars 267 are upwardly bifurcated and engaged therein are the lower ends of individually associated interponent actuating levers 268. A plate 269 secured to the section 219 of the main frame by screws 271 has extending horizontally therefrom a screw 272 upon which are pivotally supported at adjacent the centers thereof the interponent actuating levers 268. A series of guide plates 273, intermediate with spacers 274, are secured to the plate 269 by screws 276 and in the spaces formed between the guide plates are the interponent levers 268, the spacers 274 being slightly thicker than the levers so as to permit free movement of the levers. Each of the transfer levers 218 have upwardly extending projections 277, Figs. 1 and 3, the ends of which are bent horizontally into a superimposed relation with one another and each is operatively articulated with the upper end of an associated interponent actuating lever 268 by means of individual springs 278. From the above described arrangement of the transfer levers 128, the interponent actuating levers 268 and the punch pin interponents 267, Fig. 10, it can be seen that as a selection is transferred from the selector levers 114 to the transfer levers 128 causing selected ones of the transfer levers to move from their right hand position into their left hand position, associated ones of the interponent actuating levers 268 will rock in a counterclockwise direction. This causes the associated punch pin interponents 267 to slide from their left hand positions into their right hand positions. In a like manner as the selected transfer levers 128 are returned to their right hand position preparatory to the transfer of a succeeding combination the selected punch pin interponents 267 are slid to their left hand position.

Figure 11:
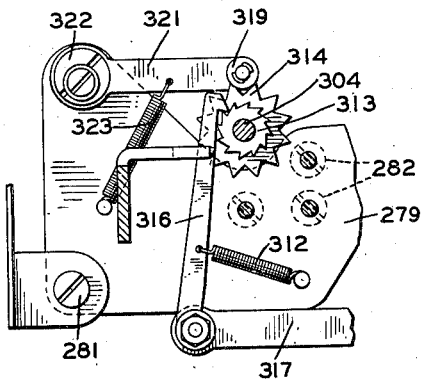
Figure 11 is a fragmentary sectional view taken on line 11—11 of Figure 1.
Figure 12:
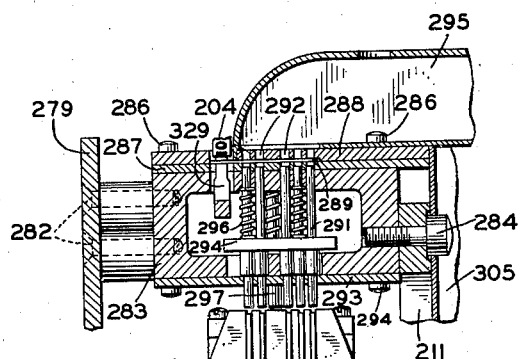
Figure 12 is a fragmentary sectional view taken on line 12—12 of Figure 1.

A punch and feed mechanism mounting plate 279, Figs. 10–12, is attached by screws such as 281 to the front side of the section 219 of the main frame casting. Attached to the front side of the plate 279 by screws 282 is a punch block 283 which is supported on its front side by screws 284 in the left hand end of the bracket casting 211. Attached by screws 286 to the top of the punch block 283 are two plates 287 and 288. A recess 289 formed between the two plates serves to guide a paper tape over a row of five punch pins 291 and beneath the typewheel 204. Five holes in the plate 287 guide the upper end of the punch pins 291 and a similar row of holes 292 in the plate 288 in alignment with the punch pins serve as dies to cooperate with the punch pins to form perforations in the tape as the punch pins are forced upward as will be hereinafter described. A plate 293 secured to the bottom of the punch block 283 by screws 294 has a row of holes therein through which the lower ends of the punch pins 291 extend and are guided thereby. The bottom faces of shoulders on the punch pins 291 normally rest on the upper surface of the plate 293 and are thus retained in the punch block 283. A plate 294 rests on the upper faces of the shoulders on the punch pins 291 and cooperates with compression spring 296 coiled about some of the punch pins and causes the punch pins that are forced upward to be returned to their normal positions as will be described. Thus the punch pins 291 are adapted to be moved vertically to punch holes in a paper tape or other recording medium. A feed hole punch pin 297 adapted to form feed holes in the tape is guided at its lower end by a hole in the plate 293 and at its upper end by a hole in a plate 298. A hole in a plate 299 located above the plate 298 serves as a die for the upper end of the feed hole punch pin 297 and a recess 301 between the two plates 298 and 299 guides the tape over the feed hole punch pin. A compression spring 300 coiled about the feed hole punch pin 297 tends to keep the pin in its lower normal position.

Attached to the top of punch block 283 by screws 302, Figs. 1 and 2, are two sets of blocks 303 in which are pivoted a tape feed shaft 304. Adjacent the center of the shaft 304 is an enlarged cylindrical section 306, Figs. 2 and 10, equal in length to the width of the paper tape which has a cylindrical row of radially extending pins 307. These pins 307 engage the feed holes in the tape formed by the feed hole punch pin 297 and advance the tape through the punch block. Attached to the top of the plate 299 is an inverted U-shaped member 308 which has fixed therein a rod 309. The rod 309 has pivotally mounted thereon a member 311 which cooperates with a spring 312 to hold the tape engaged with the pins 307. Secured adjacent the rear end of the shaft 304 for rotation therewith is a ratchet wheel 313 and a star wheel 314, Fig. 11. A ratchet dog 316 pivotally mounted on the left hand end of a feed lever 317, cooperates with the ratchet wheel 313 to rotate the shaft 304 and advance the tape. The feed lever 317, Figs. 1, 10 and 11, is pivoted adjacent its center on the rod 257 and has at its right hand end a cam follower 318 in operative relation with the feed cam 251. The star wheel 314 cooperates with a detent roller 319 on the right hand end of a lever 321 to hold the shaft 304 in its rotated position in a manner and for a purpose well known in the art. The lever 321 is pivotally mounted at its left hand end on an eccentric shoulder screw 322 extending from the plate 279 and has attached thereto a spring 323 which holds the detent roller 319 engaged with the star wheel 314. A print lever 324 is pivotally mounted on a stud 326 in the punch block 283 and has on its right hand end a roller cam follower 327 which is held in engagement with the print cam 252 by a spring 328 attached to the print lever. Adjacent the left hand end of the print lever 324 is a vertical section 329 which extends through aligned holes in the punch block 283 and plate 287 and upon operation of the print lever as hereinafter described the section 329 presses the paper tape against the typewheel 204 to take imprints therefrom.

Figure 13:
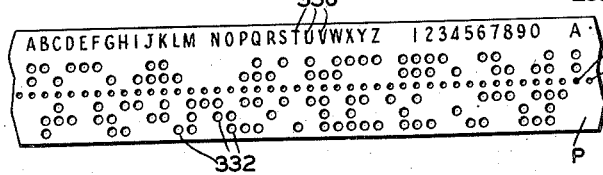
Figure 13 is a face view of a section of tape perforated and printed upon by the mechanism shown and described herein.

Assume that a selection has been transferred to the transfer lever 128, Fig. 3, and that the rotation of the operating shaft 223, Fig. 6, has been initiated as hereinbefore described. As the selected ones of the transfer levers 128 are slid to the left, corresponding ones of the punch pin interponents 267, Fig. 10, will be slid to their right hand positions. This places the vertical projections 331 at the left hand ends of these punch pin interponents 267 beneath their associated punch pins 291. Soon after the operating shaft 223 has started rotating, the feed cam 254 causes the feed lever 317 to rock in a counter-clockwise direction. This produces a downward movement of the ratchet dog 316, which in turn steps the ratchet wheel 313 an amount equal to one tooth of the ratchet wheel. As the ratchet wheel 313 steps the paper tape is advanced an amount equal to one letter space, stepping the previously printed and perforated sections out of registration with the typewheel 204 and punch pins 291 and 297 and a fresh section of the tape into registration therewith. After about a third of a revolution of the operating shaft 223 from its rest position the perforating cam 253 starts the perforating lever 259 to rock in a clockwise direction. The block 266 and the punch pin interponents 267 rock with the lever 259 and in so doing the projections 331 of the interponents in their right hand position engage the bottoms of their associated punch pins 291, forcing them upward to perforate holes in the tape. Such holes in the tape are represented at 332 in Fig. 13 and if more than one hole is punched during one operation of the punch lever 259, they will be in the same transverse section of the tape P, since the pins 291 are in a single row at right angles to the direction of movement of the tape. As the punch pins 291 are forced upward, the top of a bar 333, Fig. 10, attached to the block 266, engages the bottom of the feed hole punch pin 297 and forces it upward to punch a feed hole in the tape. The feed holes are represented at 334 in Fig. 13. As the high part of the perforating cam 253 rotates out of engagement with the cam follower 262 on the perforating lever 259, the spring 263 rocks the lever into its normal position, allowing the springs 296 and 300 to return the operated punch pins 291 and the feed hole punch pin 297 to their normal position. Thus a group of perforations are formed in the recording tape which represent, in accordance with a predetermined arrangement, a group of character selecting signals received on the selecting magnets. The punchings incident to the perforation operation are kept out of engagement with the typewheel closely adjacent thereto, by two enclosed guides 295 and 295a which guide the punchings and allow them to drop into a suitable removable container 305.

Some time after the perforating function or near the end of the revolution of the operating shaft 223 the spring 328 attached to the print lever 324 pulls the cam follower 318 into the drop in the print cam 252, thereby rocking the print lever in a clockwise direction causing the projection 329 at the left end thereof to push the tape against the typewheel 204 and take an impression therefrom. This function preferably occurs near the end of the revolution of the operating shaft 223 so as to insure that the typewheel 204 will be at rest in its selected angular position. Impressions taken from the typewheel are represented at 336 in Fig. 13 and as the printing member 329 is in alignment with the punch pins, the printed impressions 336 will be in the same transverse section of the tape P as the perforations 332, for the associated signal or cycle of operation. Thus a signal is recorded in a recording tape in a printed form and in a perforated form with the two recorded forms in register with one another.

*Blank tape feed-out.*

The method and means for stepping blank tape through the printer-perforator to allow the last character of a complete message to be advanced a sufficient amount so as to be capable of being transmitted from an associated transmitter without the necessity of breaking the tape or waiting until a sufficient number of characters of a subsequent message are perforated will now be described.

As an attendant or operator becomes aware that a complete message has been received and that another message is not to follow immediately, he operates a key 337, Figs. 1, 15 and 17. The operation of the key 337 momentarily applies ground over a conductor 338, Fig. 17, through the coil of a so-called tape stepping magnet 339, over a conductor 341 and through the normally closed contact 176 to battery, thus energizing the magnet 339 which, by means of its armature 342, is adapted to close the normally open contacts 340 and 343. The contact 176 will at this time be closed because its operating members, the selector levers 114 are all in their normal position. As the magnet 339 operates, the contact 340 applies a locking circuit thereto over a conductor 344, and through a normally closed contact 346 to the coil of the magnet. The contacts 343 and 173 are connected in parallel and therefore as contact 343 closes, it completes a circuit from the segment 181, over conductors 182 and 347, through the contact 343, over conductors 348 and 184 and through the coil of the transfer cam assembly trip magnet 186 to ground. Now when the brush 178 contacts the segments 179 and 181, the trip magnet, 186 will be energized and cause the release of the transfer cam assembly as hereinbefore described. As the transfer cam assembly rotates, it first returns all previously selected of the transfer levers 114, Fig. 3, to their right hand positions which in turn causes the punch pin interponents 267, Fig. 10, to be moved to their left hand position, and as none of the selector levers 114 are in their unoperated selected position, there will be no transfer operation. Therefore, the transfer levers 114 and the punch pin interponents 267 will all remain in their right and left hand positions respectively and when the transfer cam assembly subsequently causes the release of the operating cam shaft 223 to rock the perforating lever 259, none of the punch pins 291 will be operated. However, the feed hole punch pin 297 and the feed lever 317 will be operated for every revolution of the operating cam shaft 223 to perforate a feed hole and advance the tape one step. As the typewheel 204 will be stopped with a blank thereon over the printing hammer 329, for these conditions nothing will be printed as the printing lever 324 rocks. Thus a blank space or a tape stepper is formed in the tape and one will be formed in conjunction with every following revolution of the brush 178 or until the circuit to the trip magnet 186 is disturbed by means to be described.

A U-shaped mounting bracket 349, Figs. 1, 2 and 6, is attached by screws 351 and 352 to a boss 353 on the main frame casting and to the front side of the bracket casting 211 respectively. The tape stepping magnet 339 is attached to the inside of the bracket 349 and its armature 342, Figs. 1 and 14, is pivotally supported on a vertical pin 354, which in turn is supported by a member 356 attached to the bracket 349 by screws 357. Also secured to the bracket 349 by the screws 357 is an angle bracket 358 which has in the end thereof an adjusting screw 359 serving as a back stop for the armature 342 in its retracted position as biased by the attached spring 361. The armature 342 has adjacent its center a depending section 362 which carries in its lower end a screw 363. The screw 363 extends through a slot in the lower end of a substantially T-shaped member 364 which is pivoted adjacent the center thereof on a horizontal rod 366 supported by the bracket 349. Pivoted on a screw 367 on the rear side of the member 364, as shown in Fig. 14, is a lever 368 which is guided and limited in its pivoting movement by the upper ends of the T-shaped member 364 which are bent around the lever 368. A single wire spring 369, the lower end of which is fixed to the member 364 and the upper end to the lever 368, tends to rock the lever in a clockwise direction to keep it in its normal position. The lever 368 has a follower 371 on the left hand side thereof, as shown in Fig. 1, which is in operative relation with a worm 372. The worm 372 is fixed to a horizontal shaft 373, Figs. 1, 2 and 14, for rotation therewith, which shaft is journaled in bushings 374 supported in the bracket 349. On the front end of the shaft 373, as shown in Figs. 1 and 2, is fixed a Geneva wheel 376 which is in operative engagement with a Geneva cam 377. The Geneva cam 377 is fixed to the right hand end of the operating shaft 223 for rotation therewith and is adapted to step the Geneva wheel 376 a tenth of a revolution for each revolution of the operating shaft. Thus the worm 372 rotates at one-tenth of the speed of the operating shaft 223.

As the tape stepping magnet 339 is energized, its armature 342 causes the pivoted member 364, Fig. 14, and the lever 368 to rock sufficiently to bring the follower 371 into engagement with the worm 372. As long as the magnet 339 remains energized, with the operating shaft 233 rotating during each revolution of which the tape P will have a single feed perforation formed therein and be advanced one step, the follower 371 will follow along the worm 372 and cause the lever 368 to pivot on its mounting screw 367 in a counter-clockwise direction as shown in Fig. 14. After the desired number of tape steppers have been formed in the tape or the operating shaft 223 has made a like number of revolutions, the worm 372 will cause the lever 368 to pivot to such an extent that the upper end of the lever engages an insulated member 378 on one of the springs of the normally closed contact 346 and opens said contact. The contact 346 is in the locking circuit to the tape stepping magnet 339, Fig. 17, and its opening will break the locking circuit thereto. Thereupon the magnet 339 will be deenergized and allow its armature 342 to return to its retracted position and in so doing it causes member 364 and the lever 368, Figs. 1 and 14, to pivot about the rod 366. This withdraws the follower 371 from engagement with the worm 372 and thereupon the spring 369 rocks the lever 368 about the screw 367 to the left, Fig. 14, into its normal position. As the tape stepping magnet armature 342 returns to normal, the contacts 340 and 343 are allowed to open and as the contact 343 opens, it breaks the hereinbefore described circuit extending from the segment 181, Fig. 17, to the transfer cam assembly trip magnet 186. Therefore, as the brush 178 subsequently contacts segments 179 and 181, the magnet 186 will not be energized to release the transfer cam assembly as it did for the previous tape stepping revolutions thereof and the machine will remain in its rest condition.

Thus in the manner described above the manual operation of the key 337 at the end of a message or any other time that selecting signals are not being received will cause a predetermined number of tape steppers to be formed in the recording tape, and the machine returns to its normal condition thereafter. It is obvious that the number of tape steppers formed may be readily varied by one or more of the following expedients, such as changing the lead of the worm 372, changing the position of the contact 346 relative to the normal position of the lever 368 or varying the speed ratio between the shafts 223 and 373.

Another message is quite apt to be received over the line while tape steppers are being formed in the tape and it is necessary under these conditions that the forming of the tape steppers be immediately stopped and the machine proceed to record the received line signals. As one or more of the selector levers 114 drops down as hereinbefore described in response to a group of signals, the contact 116 is opened. This opens the locking circuit to the tape stepping magnet 339 which in turn opens the circuit through the contact 343 to the transfer cam assembly trip magnet 186 and allows the lever 368 to return to its normal position. A selector lever in dropping down also closes contact 173 to complete the circuit to the magnet 186 and cause the release of the trip magnet 186 in conjunction with the received line signals as hereinbefore described. Thus the forming of tape steppers is stopped and the recording of the received line signals proceeds.

Under certain operating conditions it may be desirable to insure that at least a predetermined amount of tape will be stepped out after the operation of the key 337, Fig. 17, regardless of whether or not it consists of perforated sections and/or tape steppers. Such a condition would exist when very short messages or groups of signals are received over the line with pauses of greater or less extent between or within the messages. This feature is accomplished by closing the self-locking key 175 which shorts out the contact 176. Thereafter with the machine forming tape stepper and a selection is received, the selector levers 114 will not break the locking circuit to the tape stepping magnet 339 as heretofore, and whenever the selector ceases operation for the time being, the forming of tape steppers will occur, provided the sum of the perforations and tape steppers formed since the operation of the key 337 does not exceed the number of tape steppers that would be formed if no selections occurred. If tape steppers were being formed at the completion of the predetermined number of tape advancing operations, the advancement of the tape would cease since the follower 371, Fig. 14, on the worm 372 would move the lever 368 sufficiently to open the contact 346, breaking the circuit to the transfer cam trip magnet 186 as heretofore described, and if signals were being received the movement of the tape would continue as long as the signals continued. Thus for a predetermined number of possible successive cycles of operation of the machine, tape steppers will be automatically interposed between the recorded perforations whenever operation of the selector ceases for one or more possible cycles of operation.

In perforators of the type described operating at a high rate of speed wherein the recording tape must be brought to a definite stop and advanced during a short interval of time, several hundred times a minute, the tape sometimes jams. When a tape jam occurs, the signals received thereafter will not be recorded in the tape as long as such a condition exists. It may be a considerable length of time before the operator becomes aware of such a condition and consequently all signals received in the meantime are not recorded and must be retransmitted from the sending station. A mechanism has been provided to signal the operator when such a condition exists whereupon he immediately remedies the situation.

Pivoted in bushings 379, Fig. 14, in the bracket 349 is a horizontal shaft 381 which has fixed adjacent the center thereof, for rotation therewith, a knurled roller 382. A second knurled roller 383 is pivotally supported in a U-shaped member 384, Fig. 2, which in turn is pivotally attached to the left hand end of a lever 386. The lever 386 is pivoted on a pin 387, extending from the bracket 349, and has attached to its right hand end a spring 388 which tends to pivot the lever 386 and keeps the roller 383 engaged with the roller 382. The tape P is adapted to pass between the rollers 382 and 383 as it goes to the punch block and hence as the tape is advanced, the rollers will be rotated by frictional engagement with the tape. Fixed by a screw 389 to the front end of the shaft 381, Figs. 1, 2 and 14, is a disc cam 391. In operative engagement with the periphery of the cam 391 at two points substantially diametrically opposite to one another are two cam followers 392 and 393. The two cam followers 392 and 393 are fixed to two substantially similar members 394 and 396, respectively, which are pivotally mounted on a common stud 397 extending horizontally from the bracket 349. A spring 398 between the two members 394 and 396 keeps the cam followers thereon engaged with the cam 391. Each of the members 394 and 396 have pivoted thereon by screws 399 and 401 levers 402 and 403, respectively, with associated single wire springs 404 and 406 which tend to pivot the levers 402 and 403 in a clockwise direction as shown in Fig. 14. Each of the levers 402 and 403 have adjacent the centers thereof, followers 407 and 408 which are in operative relation with a worm 409 on the left hand end of the shaft 373. For any position of the cam 391 the members 394 and 396 will be so rocked that one or both of the followers 407 and 408 will be engaged with the associated worm 409. The threads of the worm 409 are such that as the worm rotates, a tenth of a revolution for every revolution of the operating shaft 223 hereinbefore described, one or both of the levers 402 and 403 will pivot in a counterclockwise direction, as shown in Fig. 14. However, under ordinary conditions the tape P is advanced one step for each revolution of the shaft 223 and the tape causes the cam 391 to rotate. As the cam 391 rotates first one and then the other of the cam followers 392 and 393 ride to the high part of the cam and then drop into the notch. Such movement of the cam followers 392 and 393 causes their associated members 394 and 396 to rock back and forth on the stud 397, and as they so rock the followers 407 and 408 on their associated levers 402 and 403, respectively, are successively withdrawn from and allowed to reengage with the worm 409, the cam 391 being shaped so that one or the other or both of the followers 407 and 408 will always be engaged with the worm. When either of the followers 407 and 408 are disengaged from the worm 409, their associated springs 404 or 406, respectively, pivot the levers 402 or 403 so that the disengaged follower reengages the worm 409 at the beginning or left hand end thereof. In the event that the tape jams the cam 391 will not rotate and therefore the followers 407 and 408 will not be alternately disengaged from the worm 409. Thus as the worm 409 rotates one or both of the levers 402 and 403 will pivot a sufficient amount to allow the lower end or ends thereof to engage a piece of insulating material 410 on one spring of a normally open spring contact 411, causing the contact to close. The contact 411 is in series with a visible and/or audible signaling means 412 and as the contact closes, the signaling means operates and calls to the attention of the operator the condition of the machine. Two members 394 and 396 and their associated elements are employed so that if a tape jam occurred while a cam follower 392 or 393 was in the notch in the cam 391, the lever 402 or 403 associated with the other follower would operate the tape jam contact 411. Obviously, the above described mechanism operates in the same manner if the tape breaks or if the supply of tape becomes exhausted.

A bracket 413, Figs. 1 and 15, secured to the base plate 21 supports a tape container 414. The tape supply in the form of a roll is supported on a pivoted reel 415 in the center of the container 414 and unwinds therefrom as the tape is used or advanced. A cover plate 416 is readily removable from the front of the container when installing a new roll of tape. The tape is adversely affected by the moisture in the atmosphere and an enclosed heating lamp 417 mounted on the back of the tape container 414 is adapted to warm the tape and drive off the moisture therein before it passes to the perforating mechanism.

A pivoted lever 418 has a follower 419 on the movable end thereof adapted to be in engagement with the periphery of the roll of tape. When the roll of tape is reduced to a predetermined size a member 420 rocking with the lever 418 causes a normally open contact 421 to close. The contact 421 is in series with a visible and/or audible signaling means 422 which may or may not be the same as that employed in conjunction with the tape jam mechanism and, as the contact 421 closes, the signaling elements operate and call to the attention of the operator the fact that the tape supply is nearly exhausted.

It is often desirable that the operator at a transmitting station be able to call to the immediate attention of the operator at the receiving station a message just transmitted or to be transmitted, or to signal some other information without the necessity of transmitting the particular information. The usual way of doing this is to employ a visible and/or audible signaling means operated in response to the receipt of a predetermined code combination of impulses and the number of times the signaling means operates conveys the desired information. The operation of the signaling means 423 is controlled by a normally open contact 424 Figs. 8 and 9. The contact 424 is supported by a bracket 425, secured by screws 426 to the section 219 of the main frame casting. A bell crank 427 pivotally mounted on a screw 428 in the bracket 425 is adapted to operate the contact 424 and it is controlled by one of the stop members 297a of the typewheel stop unit 198. Each time the stop member 207a is selected, it causes the bell crank 427 to pivot and close the contact 424. The contact 424 thereupon operates the signaling means 423 once for each time the stop member 207a is selected. Thus the operator at the sending station may signal the receiving station operator predetermined information designated by the number of operations of the signaling means.

It is obvious, of course, that various modifications of the invention shown and described herein may be made without departing from the spirit or essential attributes thereof, and it is desired, therefore, that only such limitations shall be placed thereon as are imposed by the prior art or are specifically set forth in the appended claims.

What is claimed is:

1. In a telegraph receiver, a selector mechanism operable in response to received code combinations of impulses, a recording medium, a recording mechanism controlled by said selector mechanism and a recording medium advancing means normally operable as a concomitant of said recording mechanism, manually controlled means including an electric contacting device for rendering said recording medium advancing means operable independent of said selector mechanism and means for automatically rendering said recording medium advancing means inoperative after a predetermined number of operations when initiated into operation by said manually controlled means.

2. In combination, a distributor mechanism, a selector mechanism comprising a group of selectors having normal and selected positions, an associated group of pivotable selector latches normally latching said selectors in normal position, means comprising a plurality of selector magnets, one for each of said latches, sequentially operated by said distributor in synchronism and in accordance with received code combinations of impulses to unlatch associated selectors, individual resilient means associated with said selectors for moving unlatched of the same from a normal position to a selected position, a recording mechanism and means operating in timed relation to the operation of said latches and acting solely upon unlatched ones of said selectors for controlling said recording mechanisms.

3. In combination with a distributing mechanism, a selector mechanism comprising a plurality of selector magnets, a plurality of selector levers and a plurality of selector lever latches normally latching said selectors in an unselected position, means employing said selector magnets for selectively operating said latches to allow said selector levers to assume a selected position, a printing mechanism, a perforating mechanism and means operative after the selective positioning of said selector levers and employing the same for selectively controlling said printing and perforating mechanisms.

4. In a telegraph recording apparatus, a recording tape, a recording mechanism for recording received code combinations of impulses, means for advancing said tape sequentially with each operation of said recording mechanism, a signal control means and means including a contacting device operative after a predetermined number of operations of said tape advancing means wherein said tape is not advanced for operating said signal control means.

5. In combination with a recording device utilizing rolled recording paper, a receptacle for storing said rolled paper, means for unrolling and feeding said paper through said recording device, a heating element and means comprising said heating element for heating the paper within said receptacle to expel moisture from said paper.

6. In a telegraph recorder, a plurality of selector elements, a latch individual to each selector element normally latching its associated selector element in a normal position, means comprising a set of electro-magnets one individual to each latch for actuating the same to unlatch associated selectors in accordance with received code combinations, a recording mechanism and means employing only the unlatched ones of said selector elements for selectively controlling said recording mechanism.

7. In a telegraph recorder, a plurality of selector elements, a latch individual to each selector element normally latching its associated selector element in a normal position, means comprising a set of electro-magnets one individual to each latch for actuating the same to unlatch associated selectors in accordance with received code combinations, a printing mechanism, a perforating mechanism and means employing only the unlatched ones of said selector elements for controlling said printing and perforating mechanisms.

8. In a telegraph recorder, a plurality of selector elements, a latch individual to each selector element normally latching its associated selector element in a normal position, means comprising a set of electro-magnets one individual to each latch for actuating the same to unlatch associated selector elements in accordance with received code combinations, a recording mechanism, a magnet for releasing said recording mechanism for operation and means controlled by any one or more of said selector elements for partially completing the circuit to said magnet.

9. In a telegraph receiver, a series of selector elements having a normal position, an unoperated selected position and an operated selected position, a series of associated selector latches normally latching said selector elements in normal position, a series of selector magnets adapted to actuate said latches to allow said selector elements to assume unoperated selected positions in combinations corresponding to receive code combinations, a recording mechanism and means for moving said selectors in unoperated selected positions to operated selected positions for selectively controlling said recording mechanism.

10. In a telegraph receiver, a plurality of selectors each having a latched unselected, a first unlatched selected and a second unlatched selected position, a plurality of latches, one individual to each of said selectors and normally latching said selector in said unselected position, means comprising individual selector magnets responsive to received permutations of impulses associated with each latch for selectively actuating the same to unlatch said selectors, a first set of individual resilient means for moving unlatched selectors to said first unlatched selected position, a recording mechanism, power operated means for further operating said unlatched selected selectors to said second unlatched position to control said recording mechanism, and a second set of individual resilient means operative on said unlatched selectors after the operation of said power operated means to return them to said first unlatched selected position.

11. In a telegraph receiver, a plurality of selectors each having a selected and an unselected position, a plurality of latches, one individual to each of said selectors and normally latching said selector in an unselected position, means comprising individual selector magnets associated with each latch for selectively actuating the same to unlatch said selectors, a recording mechanism, a plurality of sets of individual resilient means, a plurality of power operated means and means employing said individual resilient means and said power operated means whereby said unlatched selectors move to selected positions, selectively control said recording mechanism and thereafter return to unselected positions.

12. In a telegraph receiver, a plurality of selector elements having normal, partially operated and fully operated positions, a pivotable latch individual to each selector element and normally latching its associated selector element in a normal position, means comprising a set of signal responsive means one individual to each latch for pivoting said latches to unlatch associated selector elements in accordance with received code combinations, resilient means for linearly moving unlatched of said selector elements to partially operated position, a recording means and a power operated means for pivotally moving said partially operated selector elements to fully operated positions to selectively control said recording means.

13. In a telegraph receiver, a plurality of selector elements having normal, partially operated and fully operated positions, a pivotable latch individual to each selector element and normally latching its associated selector element in a normal position, means comprising a set of signal responsive means one individual to each latch for pivoting said latches to unlatch associated selector elements in accordance with received code combinations, a first resilient means for linearly moving unlatched of said selector elements to partially operated position, a recording means, a first power operated means for pivotally moving said partially operated selector elements to fully operated positions to selectively control said recording means, a second resilient means for pivotally returning said fully operated selector elements to partially operated positions and a second power operated means for linearly returning said selector elements from partially operated positions to normal positions, said selector element actuating means operating in the order named and in overlapped relation.

14. In a telegraph receiver for recording code combinations of impulses, a recording tape, a perforating mechanism, a printing mechanism, a tape feeding mechanism, a perforating cam, a print cam, a tape feeding cam, means for rotating said cams in timed relation to received code combinations of impulses and means operable by said perforating, print and tape feeding cams for controlling the operation of their respective mechanisms.

15. In combination, a selector mechanism responsive to received code combinations of impulses, a typewheel shaft, a typewheel rotatable with said shaft, a power driven means continually tending to rotate said typewheel shaft, means controlled by said selector mechanism for selectively stopping said typewheel shaft, a plurality of independently rotatable members, a recording tape, a print lever operable by one of said independently rotatable members to actuate said tape against said typewheel to take impressions therefrom, a plurality of punch pins, means coacting with said selector mechanism and operable by another of said independently rotatable members to selectively actuate said punch pins in accordance with received code combinations of impulses to form perforations in said tape, said perforations conforming to a predetermined code arrangement representative of and in register with the impressions taken from said typewheel, means for forming feed holes in said tape in advance of said code impulse representative perforations and means operable by a third of said independently rotatable members and engaging said feed holes for advancing said tape for each received code combination of impulses.

16. In a telegraph machine, a recording means, a recording medium, a recording medium advancing means, an independently rotatable shaft with a plurality of cams thereon for operating said recording means and said recording medium advancing means, a worm rotated by said shaft, a plurality of followers for said worm normally engaged therewith and biased to the beginning of said worm relative to the rotation thereof, a signalling means, a control for said signalling means adapted to be operated by one or more of said followers when adjacent the end of said worm and means operated by the movement of said recording medium for periodically disengaging said followers from said worm prior to their movement toward the end thereof a sufficient amount to operate said signalling control means.

17. In a telegraph machine, a recording means, a recording medium, a recording medium advancing means, a cyclically operable member for operating said recording means and said recording medium advancing means, a time control means operated by said cyclically operable member, means controlled by movement of said recording medium for returning said time control means to normal, a signal control and means operative after the failure of a predetermined number of operations of said recording medium advancing means to impart movement to said recording medium for said time control means to operate said signal control.

18. In a telegraph recording machine, a selector mechanism responsive to received code combinations of signals for producing a record on a tape, a tape feed mechanism actuated upon each operation of said selector mechanism to advance the tape, a signal control means, a worm adapted to be rotated a predetermined amount concomitantly with each operation of said tape feed mechanism, means adapted to follow along said worm, means controlled by said tape to periodically remove said worm following means from engagement therewith after a predetermined distance of travel thereof along said worm and means operative on the failure of said tape controlled means to cause disengagement of said following means and said worm whereby an additional predetermined travel thereon operates said signal control means.

19. In a telegraph recording machine, a selector mechanism, responsive to received code combinations of signals for producing a record on a tape, a tape feed mechanism actuated upon each operation of said selector mechanism to advance the tape, a signal control means, a worm adapted to be rotated concomitantly with each operation of said tape feed mechanism, a plurality of means adapted to follow along said worm, means controlled by movement of said tape for alternately causing disengagement and engagement of said worm following means with said worm in a predetermined arrangement, said worm following means being adapted to invariably reengage said worm at a predetermined point and means operative on the failure of said tape feeding means to impart movement to said tape whereby said worm following means remain engaged with said worm and after a predetermined travel thereon operate said signal control means.

20. In a receiving telegraph machine having a cyclically operable selector mechanism responsive to code combination groups comprising selectors which are selected and returned to normal following each selection and transfer and storage members which are returned to normal and have the selection of said selectors transferred thereto for each cycle of operation, said transfer and storage members normally retaining their selection until returned to normal during the following cycle of operation of said selector mechanism, a recording means selectively controlled by said transfer and storage members, and means for actuating said recording means upon an interruption of code combination groups without repeating the last code group recorded.

21. In a receiving telegraph machine having a cyclically operable selector mechanism responsive to code combination groups comprising selectors which are selected and returned to normal following each selection and transfer and storage members which are returned to normal and have the selection of said selectors transferred thereto for each cycle of operation, said transfer and storage members normally retaining their selection until returned to normal during the following cycle of operation of said selector mechanism, a recording tape, a recording mechanism controlled by said transfer and storage members, normally cyclically operable with said selector mechanism to record selected characters on said tape and concomitantly advance said tape, and means manually operable upon the cessation of received code combination groups for initiating the operation of said recording mechanism for a predetermined number of operations to advance said tape, without repeating the last code group recorded.

22. In a receiving telegraph machine having a cyclically operable selector mechanism responsive to code combination groups comprising selectors which are selected and returned to normal following each selection and transfer and storage members which are returned to normal and have the selection of said selectors transferred thereto for each cycle of operation, said transfer and storage members normally retaining their selection until returned to normal during the following cycle of operation of said selector mechanism, a recording tape, a recording mechanism controlled by said transfer and storage members, normally cyclically operable with said selector mechanism to record selected characters on said tape and concomitantly advance said tape, means manually operable upon the cessation of received code combination groups for returning said transfer and storage members to normal position and initiating the operation of said recording mechanism for a predetermined number of operations, said recording mechanism operating to only advance said tape with said transfer and storage members in normal position, and means for automatically returning the control of said recording mechanism to said selector mechanism on the resumption of said code signal groups occurring before said predetermined number of operations of said recording mechanism.

23. In a receiving telegraph machine having a cyclically operable selector mechanism responsive to code combination groups comprising selectors which are selected and returned to normal following each selection and transfer and storage members which are returned to normal and have the selection of said selectors transferred thereto for each cycle of operation, said transfer and storage members normally retaining their selection until returned to normal during the following cycle of operation of said selector mechanism, a recording means selectively controlled by said transfer and storage members, and manually operable means for initiating the operation of said recording mechanism for at least a predetermined number of successive operations regardless of the operativeness of said selector mechanism.

24. In a receiving telegraph machine having a cyclically operable selector mechanism responsive to code combination groups comprising selectors which are selected and returned to normal following each selection and transfer and storage members which are returned to normal and have the selection of said selectors transferred thereto for each cycle of operation, said transfer and storage members normally retaining their selection until returned to normal during the following cycle of operation of said selector mechanism, a recording means selectively controlled by said transfer and storage members, and manually operable means for initiating the operation of said recording mechanism for at least a predetermined number of successive operations regardless of the operativeness of said selector mechanism, said recording mechanism ceasing successive operations at the completion of said predetermined number of operations on the cessation of operation of said selector mechanism preceding or accompanying the last of said predetermined number of operations.

25. In a telegraph receiver, a selector mechanism responsive to code signals received over a line, a cyclically operable recording means normally controlled by said selector mechanism for producing a record on a tape and advancing the tape upon each operation of said selector mechanism, an auxiliary control for said recording means and manually operable means including an electrical contacting device for shifting the control of said recording means from said selector mechanism to said auxiliary means, and means whereby said manually operable means is effective only upon an abnormal interruption of code signals to said selector mechanism.

26. In a telegraph receiver, a selector mechanism responsive to code signals received over a line, a cyclically operable recording means normally controlled by said selector mechanism for producing a record on a tape and advancing the tape upon each operation of said selector mechanism, an auxiliary control for said recording means, said recording means when operated by said auxiliary control operating through a complete cycle and being effective to only advance said tape, and manually controlled means including an electrical contacting device operable on an abnormal interruption of code signals to said selector mechanism for shifting control of said recording means to said auxiliary control for a predetermined number of cycles of operation thereof.

27. In combination in a telegraph receiver, a selector mechanism responsive to received code signals, an independently and cyclically operable recording means normally controlled by said selector mechanism for producing a record of said code signals on a tape and advancing the tape on each operation thereof, a manually operable device including a circuit controlling device, and means operative on the operation of said manually operable means for interposing cycles of operation of said recording means between selector controlled cycles upon abnormal interruptions of code signals to said selector mechanism for a predetermined number of total cycles of operation of said recording means, and means whereby said interposed cycles of operation of said recording means are effective to only advance the tape.

28. In a telegraph recorder, a plurality of selector elements, a latch individual to each selector element normally latching its associated selector element in a normal position, means comprising a set of electro-magnets one individual to each latch for actuating the same to unlatch associated selectors in accordance with received code combinations, a plurality of recording mechanisms and means employing only the unlatched ones of said selector elements and bodily moving the same for controlling said recording mechanisms.

29. In a telegraph recorder, a plurality of selector elements, a latch individual to each selector element normally latching its associated selector element in a normal position, means comprising a set of electro-magnets one individual to each latch for actuating the same to unlatch associated selector elements in accordance with received code combinations; a recording mechanism, a magnet for releasing said recording mechanism for operation, means controlled by any one or more of said selector elements for partially completing the circuit to said magnet and further means operating in timed relation to the received code combinations for fully completing the partially completed circuit to the recording mechanism release magnet.

30. In a telegraph machine, a series of selector elements having a normal position, a partially operated position and a fully operated position, individual resilient means tending to move said elements from said normal positions to said partially operated positions, a series of latches normally latching said selector elements in normal positions, a series of selecting magnets for selectively actuating said latches in accordance with received code combinations to unlatch the same from said selector elements whereupon said resilient means move said unlatched selector elements to partially operated positions, a power driven transfer means normally at rest for moving said selector elements from partially operated positions to said fully operated positions and means employing said selector elements in said partially operated positions for partially conditioning said transfer means for operation.

31. In a telegraph receiver, a plurality of selectors each having a selected and an unselected position, a plurality of latches, one individual to each of said selectors and normally latching said selector in an unselected position, means comprising individual selector magnets associated with each latch for selectively actuating the same to unlatch said selectors, individual resilient means for moving unlatched selectors to a selected position, a recording mechanism, a first power operated means for further operating said unlatched selected selectors to control said recording mechanism, other individual resilient means operative on said unlatched selectors after the operation of said power operated means to return them to said unlatched position, and a second power operated means operative after said other resilient means for returning said unlatched selectors to said unselected position.

32. In a telegraph machine, a group of primary selectors having normal and selected positions, a group of latches normally latching said selectors in normal position, a plurality of signal responsive means cooperating with said latches whereby said primary selectors are selectively positioned in accordance with received signals, a group of secondary selectors having normal and selected positions, a first power operated means for successively normally positioning said secondary selectors, a second power operated means for successively transferring the selection set up in said primary selectors directly to said secondary selectors and a third power operated means for successively restoring selected of said primary selectors to normal position, said first, second and third power operated means operating in a time interval less than that required to selectively position said primary selectors.

33. In a telegraph machine, a group of primary selectors having normal and selected positions, a group of latches normally latching said selectors in normal position, a plurality of signal responsive means cooperating with said latches whereby said primary selectors are selectively positioned in accordance with received signals, a group of secondary selectors, a second power operated means for successively transferring the selection set up in said primary selectors directly to said secondary selectors and a third power operated means for successively restoring selected of said primary selectors to normal position, said first, second and third power operated means operating in overlapped relation and in a time interval less than that required to selectively position said primary selectors.

34. In a telegraph machine, a recording means, a recording medium, a recording medium advancing means, an independently rotatable shaft with a plurality of cams thereon for operating said recording means and said recording medium advancing means, a worm rotated by said shaft, a plurality of members each pivotable about a plurality of points, means comprising said worm for pivoting said members about a first point, means controlled by said recording medium for periodically pivoting said members about a second point, a signalling means, a signal control means and means whereby the failure of said recording medium to pivot said members about said second point allows said worm to pivot them about said first point a sufficient amount to operate said signal control means.

35. In a telegraph recording machine, a selector mechanism responsive to received code combinations of signals for producing a record on a tape, a tape feed mechanism actuated upon each operation of said selector mechanism to advance the tape, a signal control means, a worm adapted to be rotated concomitantly with each operation of said tape feed mechanism, and means adapted to travel along said worm, said means being conditioned to travel along said worm upon the inaction of said tape feed mechanism to advance said tape and after a predetermined travel thereof to operate said signal control means.

36. In a telegraph recording machine, a selector mechanism responsive to received code combinations of signals for producing a record on a tape, a tape feed mechanism actuated upon each operation of said selector mechanism to advance the tape, a signal control means, a worm adapted to be rotated concomitantly with each operation of said tape feed mechanism, a plurality of means adapted to follow along said worm on rotation thereof, means operated by said tape feeding mechanism embodying said tape for successively and in turn engaging and disengaging said worm following means with said worm in a manner so that never less than one of said following means is always engaged with said worm, said worm following means invariably reengaging said worm adjacent the beginning thereof relative to its rotation, and means operative on the ineffectiveness of said tape feed mechanism to advance said tape to render said worm follower disengaging means inoperative whereupon continued rotation of said worm causes said worm following means to operate said signal control means.

37. In a receiving telegraph machine having a cyclically operable selector mechanism responsive to code combination groups comprising selectors which are selected and returned to normal following each selection and transfer and storage members which are returned to normal and have the selection of said selectors transferred thereto for each cycle of operation, said transfer and storage members normally retaining their selection until returned to normal during the following cycle of operation of said transfer and storage members and manually operated means for initiating the operation of said recording means upon an interruption of code combination groups without repeating the last code group recorded.

38. In a receiving telegraph machine having a cyclically operable selector mechanism responsive to code combination groups comprising selectors which are selected and returned to normal following each selection and transfer and storage members which are returned to normal and have the selection of said selectors transferred thereto for each cycle of operation, said transfer and storage members normally retaining their selection until returned to normal during the following cycle of operation of said selector mechanism, a recording tape, a recording mechanism controlled by said transfer and storage members normally operable with said selector mechanism to record selected characters on said tape and concomitantly advance said tape and means manually operable upon the cessation of received code combination groups for returning said transfer and storage members to normal position and initiating the operation of said recording mechanism for a predetermined number of operations, said recording mechanism operating to only advance said tape with said transfer and storage members in normal position.

39. In a telegraph receiver, a selector mechanism responsive to code signals received over a line, a cyclically operable recording means normally controlled by said selector mechanism for producing a record on a tape and advancing the tape upon each operation of said selector mechanism, an auxiliary control for said recording means and means whereby each cycle of operation of said recording means when under the control of said auxiliary control is effective to only advance the tape.

40. In a telegraph receiver, a selector mechanism responsive to code signals received over a line, a cyclically operable recording means normally controlled by said selector mechanism for producing a record on a tape and advancing the tape upon each operation of said selector mechanism, an auxiliary control for said recording means and manually operable means for shifting the control of said recording means from said selector mechanism to said auxiliary means, said manually operable means being effective only upon an abnormal interruption of code signals to said selector mechanism.

41. In combination in a telegraph receiver, a selector mechanism responsive to received code signals, an independently and cyclically operable recording means normally controlled by said selector mechanism for producing a record of said code signals on a tape and advancing the tape on each operation thereof, and means for interposing cycles of operation of said recording means between selector controlled cycles upon abnormal interruptions of code signals to said selector mechanism for a predetermined number of total cycles of operation of said recording means.

ROBERT F. DIRKES.
ROLLINS WENTWORTH.